United States Patent
Chang et al.

(10) Patent No.: US 12,189,273 B2
(45) Date of Patent: *Jan. 7, 2025

(54) IMAGE CAPTURING UNIT, CAMERA MODULE AND ELECTRONIC DEVICE

(71) Applicant: LARGAN PRECISION CO., LTD., Taichung (TW)

(72) Inventors: Lin An Chang, Taichung (TW); Pei-Chi Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,072

(22) Filed: Dec. 5, 2023

(65) Prior Publication Data

US 2024/0103345 A1 Mar. 28, 2024

Related U.S. Application Data

(63) Continuation of application No. 18/111,833, filed on Feb. 20, 2023, now Pat. No. 11,874,585, which is a
(Continued)

(30) Foreign Application Priority Data

Jun. 11, 2021 (TW) ................. 110121548

(51) Int. Cl.
*G03B 17/17* (2021.01)
(52) U.S. Cl.
CPC .................... *G03B 17/17* (2013.01)
(58) Field of Classification Search
CPC .... G03B 17/17; G02B 7/1805; G02B 13/007; B29D 11/00; B29C 2045/0027
See application file for complete search history.

(56) References Cited

U.S. PATENT DOCUMENTS

| | | | |
|---|---|---|---|
| 4,941,012 A | * | 7/1990 | Inabata ................. G03B 13/06 396/379 |
| 9,279,953 B2 | | 3/2016 | Hou |

(Continued)

FOREIGN PATENT DOCUMENTS

| | | |
|---|---|---|
| CN | 104570256 B | 7/2017 |
| CN | 213210572 U | 5/2021 |

(Continued)

OTHER PUBLICATIONS

Diverseoptics, Specifications of Optical Grade Polymers retrieved on Jun. 10, 2024 from {//https://diverseoptics.com/materials-chart.pdf} Mar. 2016.*

(Continued)

*Primary Examiner* — Christopher E Mahoney
(74) *Attorney, Agent, or Firm* — Maschoff Brennan

(57) ABSTRACT

An image capturing unit includes an imaging element and a dual-shot injection-molded optical folding element that are adjacent to each other. The imaging element is configured for an imaging light to pass through. The dual-shot injection-molded optical folding element includes a first part and a second part. The first part is made of transparent material. The first part has a reflective surface configured to reflect the imaging light. The second part is made of opaque material, and the second part is fixed at periphery of the first part. The second part includes a supporting portion configured to support the dual-shot injection-molded optical folding element. The supporting portion maintains the dual-shot injection-molded optical folding element at a predetermined position corresponding to the imaging element through mechanism assembly.

12 Claims, 22 Drawing Sheets

Related U.S. Application Data continuation of application No. 17/458,049, filed on Aug. 26, 2021, now Pat. No. 11,614,676.

(56) References Cited

U.S. PATENT DOCUMENTS

| | | | |
|---|---|---|---|
| 9,581,784 | B2 | 2/2017 | Ishiguri et al. |
| 9,671,527 | B2 | 6/2017 | Huang et al. |
| 10,067,320 | B2 | 9/2018 | Lu et al. |
| 10,126,529 | B2 | 11/2018 | Chou |
| 10,234,658 | B2 | 3/2019 | Lin et al. |
| 10,451,852 | B2 | 10/2019 | Chou et al. |
| 11,614,676 | B2 * | 3/2023 | Chang .................... G03B 17/17 359/726 |
| 11,874,585 | B2 * | 1/2024 | Chang .................. G02B 13/007 |
| 2007/0077057 | A1 | 4/2007 | Chang |
| 2015/0323757 | A1 | 11/2015 | Bone |
| 2017/0276903 | A1 | 9/2017 | Chang |
| 2017/0322394 | A1 | 11/2017 | Chou |
| 2020/0064527 | A1 | 2/2020 | Shigemitsu et al. |
| 2020/0073028 | A1 | 3/2020 | Shigemitsu et al. |
| 2020/0183058 | A1 | 6/2020 | Shinohara |
| 2020/0301160 | A1 | 9/2020 | Fujisaki |
| 2021/0333518 | A1 | 10/2021 | Chang |

FOREIGN PATENT DOCUMENTS

| | | | |
|---|---|---|---|
| JP | 2011237525 | A | 11/2011 |
| KR | 100895713 | B1 | 4/2009 |
| KR | 20130011571 | A | 1/2013 |

OTHER PUBLICATIONS

Gemini Group, "Two-Shot & Multi Shot Injection Molding" retrieved Jun. 30, 2023 from {https://web.archive.org/web/20210420222515/https://geminigroup.net/plastics/two-shot-and-injection-molding-tpi/processes/two-shot-multi-shot/} Apr. 2021.*
European Search Report dated Mar. 29, 2022 as received in application No. 21201153.0.
IN Office Action in Application No. 202134057127 dated Dec. 20, 2022.

* cited by examiner

IMAGE CAPTURING UNIT, CAMERA MODULE AND ELECTRONIC DEVICE

RELATED APPLICATIONS

This application is a continuation patent application of U.S. application Ser. No. 18/111,833, filed on Feb. 20, 2023, which is a continuation patent application of U.S. application Ser. No. 17/458,049, filed on Aug. 26, 2021, which claims priority to Taiwan Application 110121548, filed on Jun. 11, 2021, which is incorporated by reference herein in its entirety.

BACKGROUND

Technical Field

The present disclosure relates to an image capturing unit, a camera module and an electronic device, more particularly to an image capturing unit and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large in size, thereby unable to meet the requirements of the current technology trends. To achieve compactness, the optical systems may be configured to have a folded optical axis so as to reduce the dimension of the optical systems in a specific direction, thereby reducing the total system size. However, in order to achieve this folded optical axis configuration, the conventional optical systems need an additional installation structure for accommodating an optical folding element.

Accordingly, how to improve the optical systems for directly mounting an optical folding element to achieve the feasibility of folded optical axis configuration so as to meet the requirement of high-end-specification electronic devices is an important topic in this field nowadays.

SUMMARY

According to one aspect of the present disclosure, an image capturing unit includes at least one imaging element and a dual-shot injection-molded optical folding element. The at least one imaging element is configured for an imaging light to pass through. The dual-shot injection-molded optical folding element is adjacent to the at least one imaging element. The dual-shot injection-molded optical folding element includes a first part and a second part. The first part is made of transparent material. The first part has an incident surface, an emitting surface, and a reflective surface. The incident surface faces an object side and is configured for the imaging light to pass through. The emitting surface faces an image side and is configured for the imaging light to pass through. The reflective surface is located between the incident surface and the emitting surface and configured to reflect the imaging light.

The second part is made of opaque material, and the second part is fixed at a periphery of the first part. The second part includes a supporting portion configured to support the dual-shot injection-molded optical folding element. The supporting portion maintains the dual-shot injection-molded optical folding element at a predetermined position corresponding to the at least one imaging element through mechanism assembly.

According to another aspect of the present disclosure, a camera module includes the aforementioned image capturing unit and an image sensor, wherein the image sensor is disposed on an image surface of the image capturing unit.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
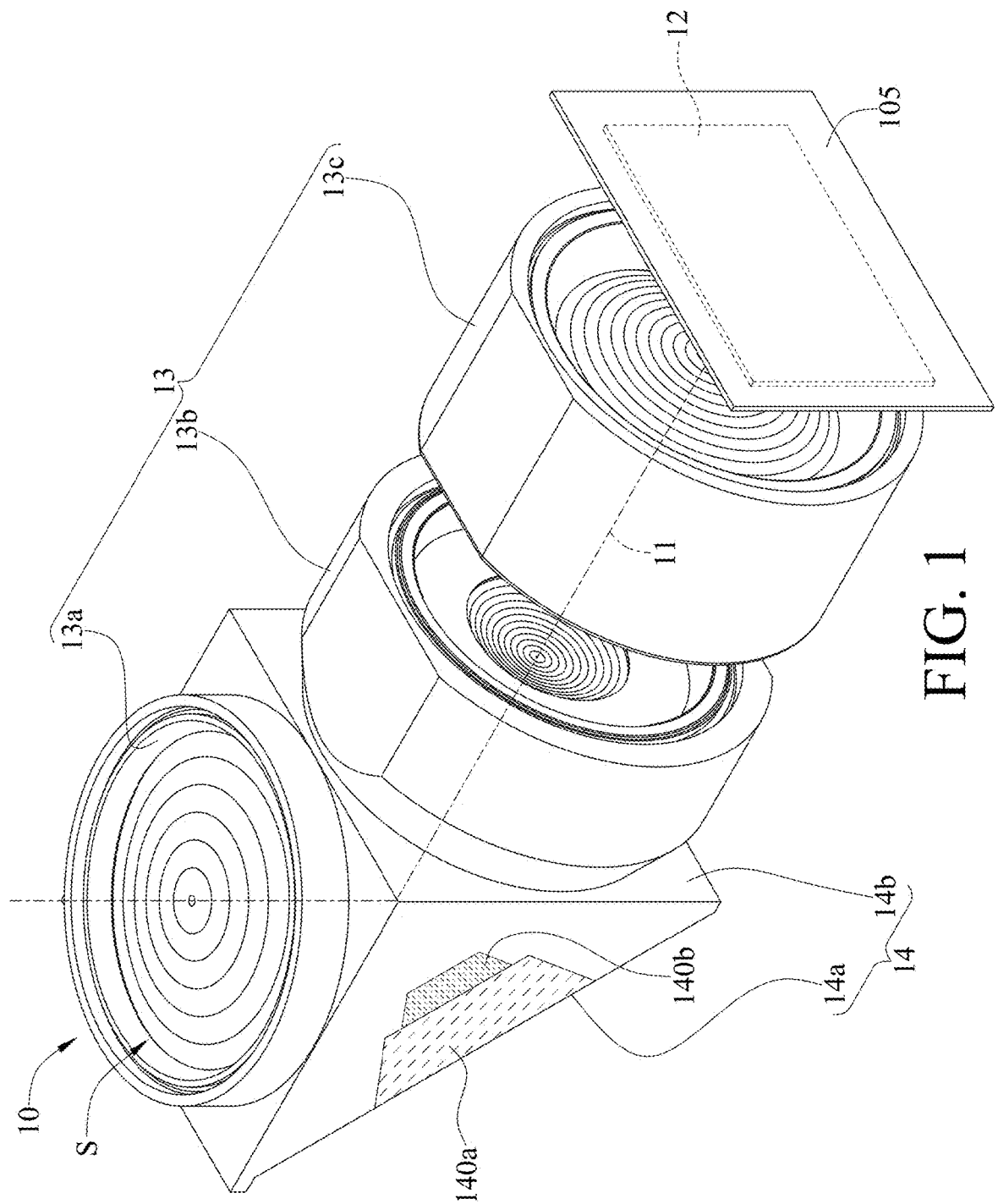
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an image capturing unit including at least one imaging element and a dual-shot injection-molded optical folding element, wherein the dual-shot injection-molded optical folding element can have an optical path folding function. The dual-shot injection-molded optical folding element is adjacent to the at least one imaging element. Moreover, the at least one imaging element can be located at an object side or an image side of the dual-shot injection-molded optical folding element.

The at least one imaging element is configured for an imaging light to pass through. Moreover, the number of the at least one imaging element can be plural. Moreover, the at least one imaging element can also include a movable element. Therefore, it is favorable for providing an optical configuration of adjustable focus position so as to reduce driving difficulty. Please refer to FIG. 1, which shows the third imaging element 13c that is movable between the second imaging element 13b and the image surface 12 according to the 1st embodiment of the present disclosure.

The dual-shot injection-molded optical folding element includes a first part and a second part. The first part is made of transparent material, while the second part is made of opaque material. Moreover, each of the transparent material of the first part and the opaque material of the second part can include plastic material. In specific, the first part can include transparent plastic material, while the second part can include black opaque plastic material. Therefore, it is favorable for utilizing the second part of black plastic material with high mechanical strength to perform assembly so as to prevent the first part of transparent plastic material from being in direct contact with another component, thereby preventing squeezing, deforming or scratching the first part of transparent material and ensuring surface quality of the optical surface of the abovementioned another component. Note that the first part of transparent plastic material and the second part of black plastic material are only exemplary, and the present disclosure is not limited thereto. Moreover, the dual-shot injection-molded optical folding element can be one piece made by a dual-shot injection molding. Therefore, it is favorable for providing a molding manner with high dimensional accuracy of the dual-shot injection-molded optical folding element. Moreover, the dual-shot injection-molded optical folding element can be manufactured by molding the transparent first part and then molding the opaque second part; alternatively, the dual-shot injection-molded optical folding element can also be manufactured by molding the opaque second part and then molding the transparent first part. However, the present disclosure is not limited to the molding sequence of the dual-shot injection-molded optical folding element. Moreover, each of the first part and the second part can have at least one gate trace. Therefore, it is favorable for providing a fast injection rate and a high molding yield rate.

The first part has an incident surface, an emitting surface and a reflective surface. The incident surface faces an object side and is configured for the imaging light to pass through. The emitting surface faces an image side and is configured for the imaging light to pass through. The reflective surface is located between the incident surface and the emitting surface, and the reflective surface is configured to reflect the imaging light so as to provide the optical path folding function of the dual-shot injection-molded optical folding element. The incident surface, the emitting surface and the reflective surface can be optical surfaces. The optical surface can be a smooth optical plane, a refractive optical spherical surface or a refractive optical aspheric surface.

When the at least one imaging element is located at the object side of the dual-shot injection-molded optical folding element, the at least one imaging element and the incident surface can correspond to each other. Therefore, it is favorable for providing a configuration manner for assembly from the object side. When the at least one imaging element is located at the image side of the dual-shot injection-molded optical folding element, the at least one imaging element and the emitting surface can correspond to each other. Therefore, it is favorable for providing a configuration manner for assembly from the image side. When the number of the at least one imaging element is plural, two of the imaging elements can be respectively located at the object side and the image side of the dual-shot injection-molded optical folding element. Therefore, it is favorable for providing two configuration manners for assembly from the object side and the image side.

The second part is fixed at a periphery of the first part. Moreover, the first part can further have a recessed structure that is recessed from the outer side to the inner side of the first part, and the second part is partially filled in the recessed structure. Therefore, it is favorable for blocking stray light inside the dual-shot injection-molded optical folding element so as to increase image quality and bonding efficiency during molding the first part and the second part. Please refer to FIG. 17, which shows the recessed structure 344 that is recessed from the outer side to the inner side of the first part 34a according to the 3rd embodiment of the present disclosure. Moreover, the second part of the dual-shot injection-molded optical folding element can be disposed on at least one surface of the incident surface, the emitting surface and the reflective surface, and the second part can have at least one opening at a side thereof corresponding to the at least one surface. Therefore, it is favorable for taking the second part as an aperture stop on the optical surface and defining the light passable area. Moreover, the at least one opening can be non-circular. Therefore, it is favorable for maintaining aperture configuration with high light-blocking efficiency in a limited space. Please refer to FIG. 13, which shows the non-circular openings 346 that respectively correspond to the incident surface 341 and the emitting surface 342 according to the 3rd embodiment of the present disclosure.

The second part include a supporting portion that is configured to support the dual-shot injection-molded optical folding element. The support for the dual-shot injection-molded optical folding element can represent that the dual-shot injection-molded optical folding element is in physical contact with an adjacent component through the supporting portion. Therefore, it is favorable for the supporting portion to provide a mechanism assembly function and a supporting function for the dual-shot injection-molded optical folding element, thereby achieving the feasibility of a camera module with a folded optical path. The supporting portion maintains the dual-shot injection-molded optical folding element at a predetermined position corresponding to the at least one imaging element through mechanism assembly in a manner of connection or alignment between each other. Therefore, it is favorable for replacing assembling component with the dual-shot injection-molded optical folding element so as to reduce the assembly processes and product manufacturing cost. Moreover, the supporting portion and the at least one imaging element can abut to each other. Therefore, it is favorable for stabilizing the distance between the dual-shot injection-molded optical folding element and the at least one imaging element so as to prevent impact during assembly. Moreover, the predetermined position can be an immovable relative position; alternatively, the predetermined position can also be a corresponding range within which the dual-shot injection-molded optical folding element and the at least one imaging element can make relative motion. Please refer to FIG. 2 and FIG. 15, which respectively show the dual-shot injection-molded optical folding element 14 maintained at an immovable predetermined position with respect to the first imaging element 13a and the second imaging element 13b according to the 1st embodiment of the present disclosure, and the dual-shot injection-molded optical folding element 34 maintained at an immovable predetermined position with respect to the imaging element 33 according to the 3rd embodiment of the present disclosure. Please refer to FIG. 8, which shows the dual-shot injection-molded optical folding element 24 pivotable within a corresponding range of a predetermined position according to the 2nd embodiment of the present disclosure.

The supporting portion can have an alignment structure, and a center of the dual-shot injection-molded optical folding element can be aligned with a center of the at least one imaging element through the alignment structure. Therefore, it is favorable for utilizing the alignment structure to reduce assembly tolerance and further increase assembly structural strength. Moreover, the alignment structure can have a planar surface and an inclined surface that are configured for reducing tilt and offset between the dual-shot injection-molded optical folding element and the at least one imaging element. Therefore, it is favorable for making the imaging light close to the theoretical path so as to reduce optical aberrations and provide high optical specifications. Please refer to FIG. 2, FIG. 6 and FIG. 7, which show the alignment structure 1471 and the planar surface 1471a and the inclined surface 1471b thereof according to the 1st embodiment of the present disclosure. Please refer to FIG. 14 and FIG. 16, which show the alignment structure 3471 and the planar surface 3471a and the inclined surface 3471b thereof according to the 3rd embodiment of the present disclosure.

According to the present disclosure, the image capturing unit can further include an arc-shaped step structure. The arc-shaped step structure can be disposed on at least one surface of the incident surface, the emitting surface and the reflective surface, and the arc-shaped step structure can have an arc-shaped contour formed by taking the center of the at least one surface as the center point thereof. Therefore, it is favorable for effectively controlling the surface accuracy of the optical surface so as to reduce the molding tolerance of the optical surface. Please refer to FIG. 9 and FIG. 10, which show the arc-shaped step structure 25 according to the 2nd embodiment of the present disclosure. Please refer to FIG. 16, which shows the arc-shaped step structure 35 according to the 3rd embodiment of the present disclosure.

When a maximum field of view of the image capturing unit is FOV, the following condition can be satisfied: 5 [deg.]<FOV<40 [deg.]. Therefore, it is favorable for providing a telephoto image capturing unit with a small viewing angle.

When an Abbe number of the first part of the dual-shot injection-molded optical folding element is V, the following condition can be satisfied: $40 \leq V \leq 65$. Therefore, it is favorable for reducing optical chromatic aberration so as to provide high image quality. Moreover, the first part can include low-dispersion material.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
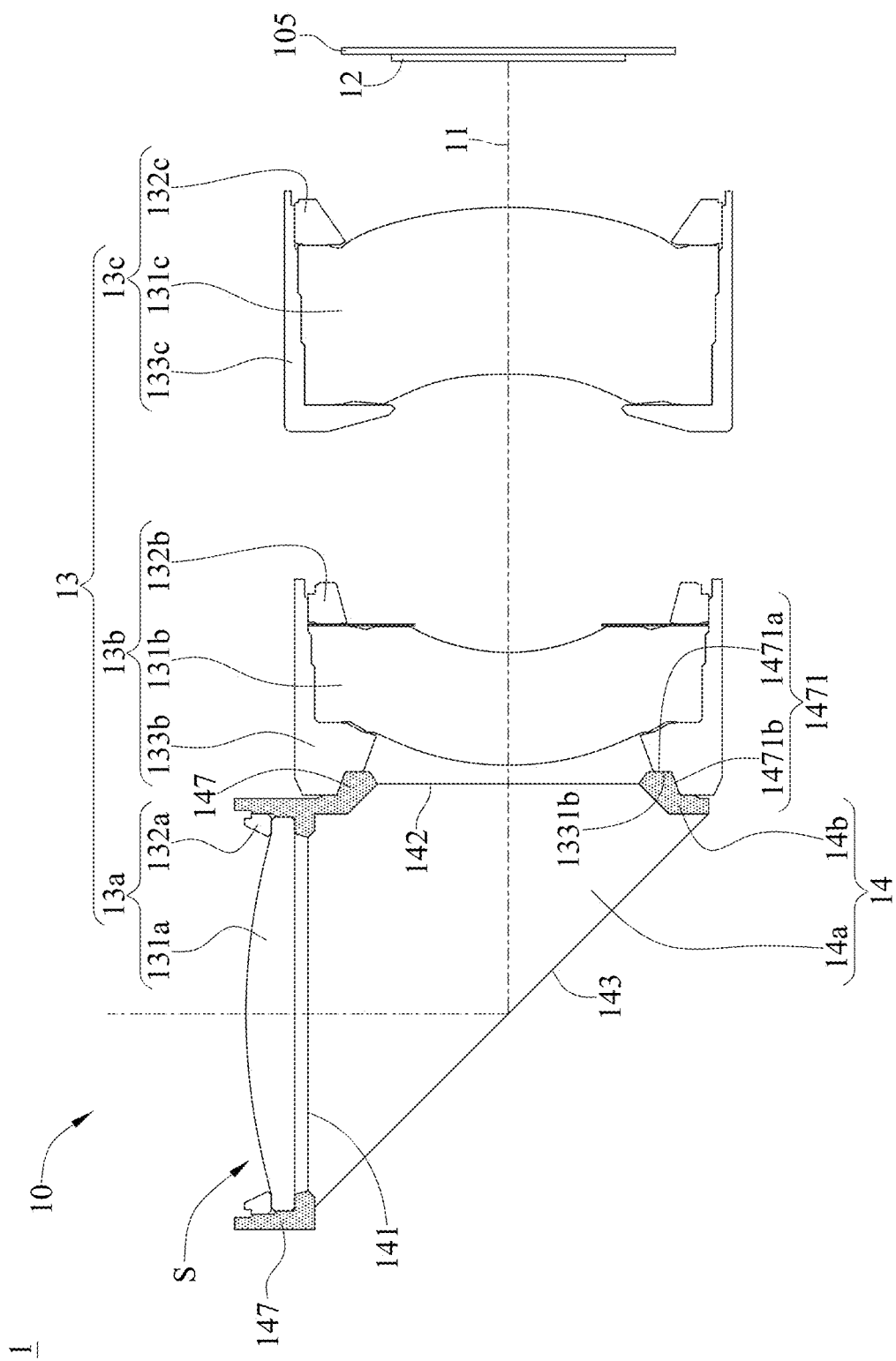
FIG. 2 is a cross-sectional view of the camera module in FIG. 1.
Figure 3:
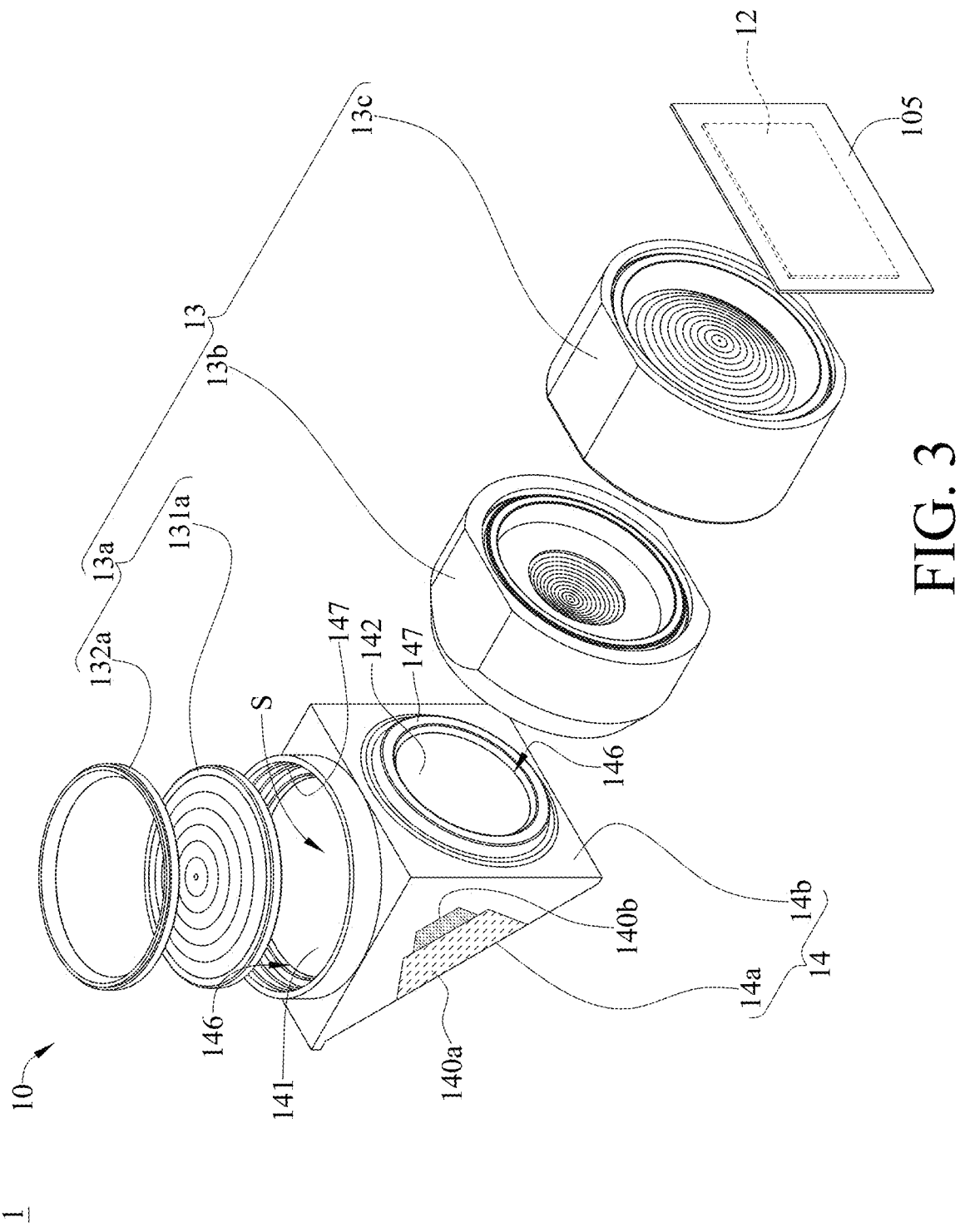
FIG. 3 is an exploded view of the camera module in FIG. 1.
Figure 4:
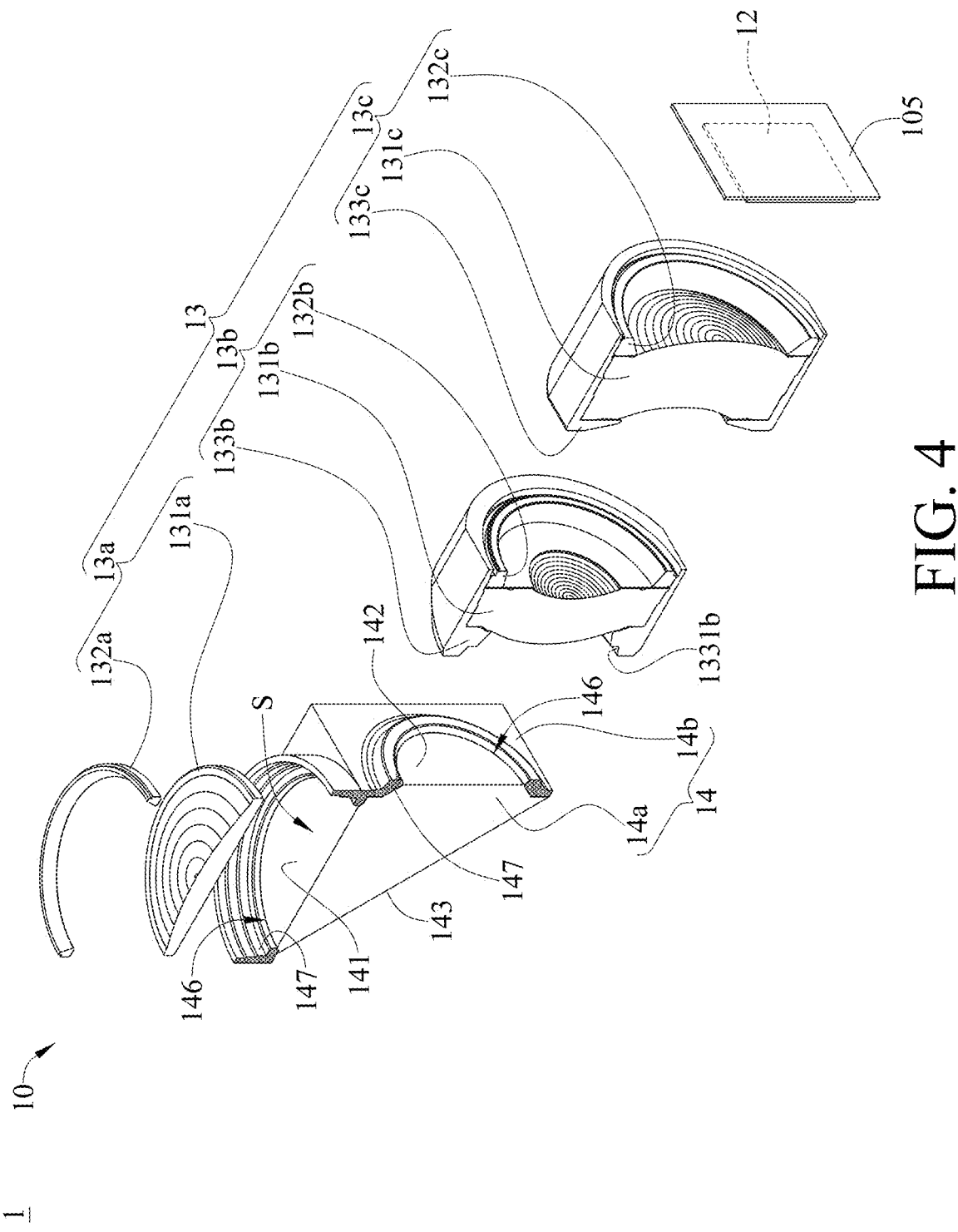
FIG. 4 is an exploded view of the sectioned camera module in FIG. 1.
Figure 5:
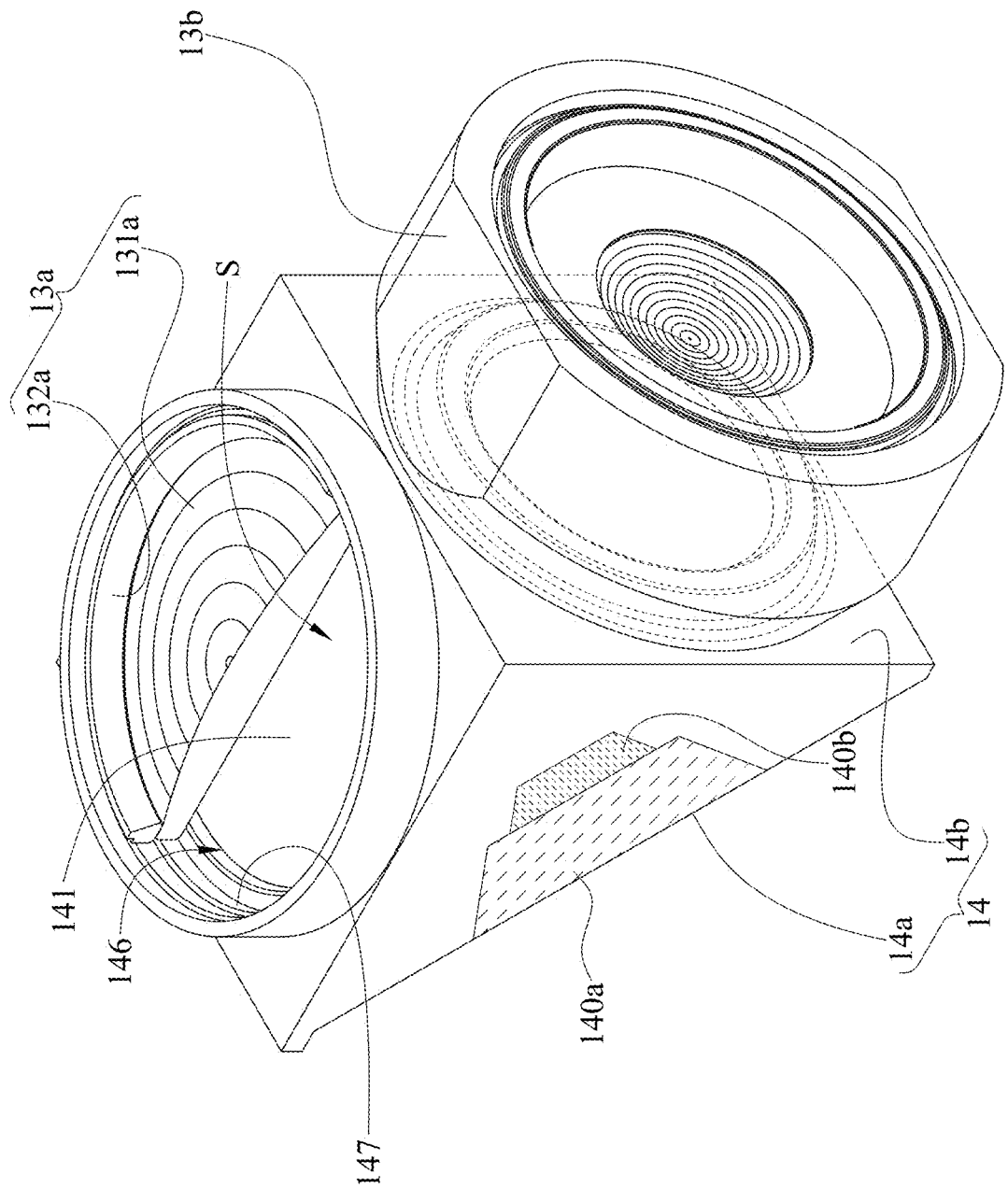
FIG. 5 is a perspective view of the partial camera module in FIG. 1 where a first imaging element thereof is sectioned.
Figure 6:
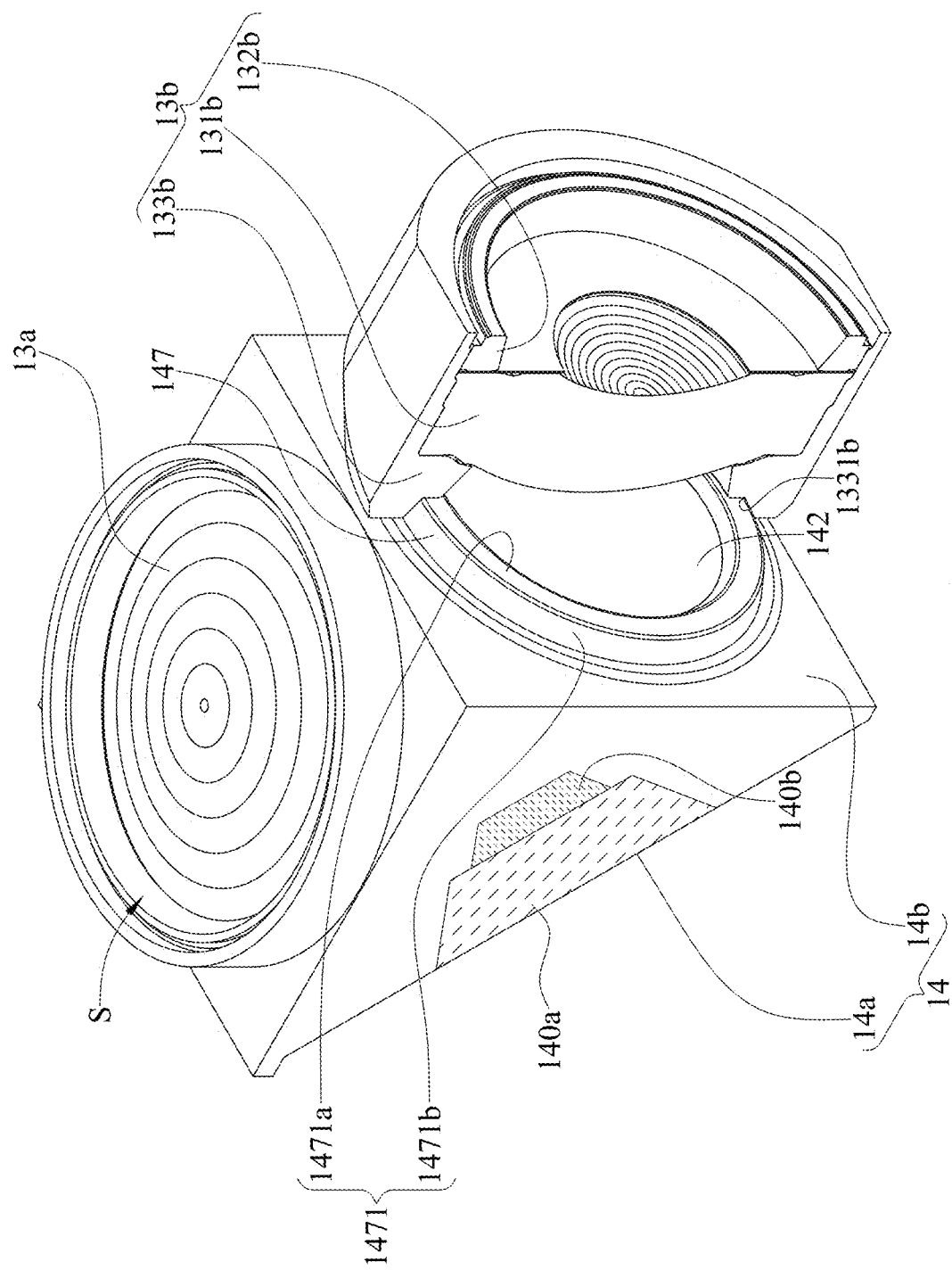
FIG. 6 is a perspective view of the partial camera module in FIG. 1 where a second imaging element thereof is sectioned.
Figure 7:
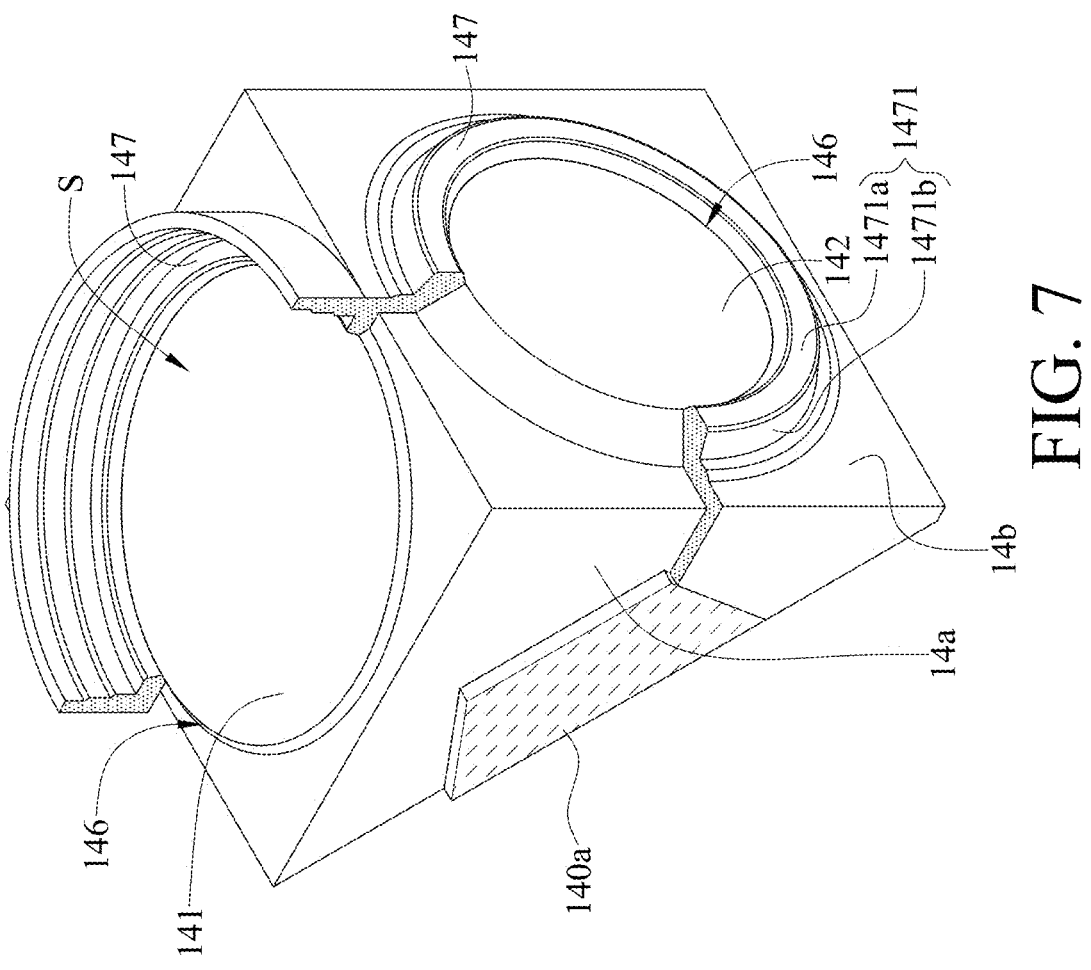
FIG. 7 is a perspective view of a sectioned dual-shot injection-molded optical folding element of the camera module in FIG. 1.

Please refer to FIG. 1 to FIG. 7, where FIG. 1 is a perspective view of a camera module according to the 1st embodiment of the present disclosure, FIG. 2 is a cross-sectional view of the camera module in FIG. 1, FIG. 3 is an exploded view of the camera module in FIG. 1, FIG. 4 is an exploded view of the sectioned camera module in FIG. 1, FIG. 5 is a perspective view of the partial camera module in FIG. 1 where a first imaging element thereof is sectioned, FIG. 6 is a perspective view of the partial camera module in FIG. 1 where a second imaging element thereof is sectioned, and FIG. 7 is a perspective view of a sectioned dual-shot injection-molded optical folding element of the camera module in FIG. 1.

This embodiment provides a camera module 1 that includes a housing (not shown), an image capturing unit 10 and an image sensor 105. The image capturing unit 10 is disposed in the housing. The image capturing unit 10 has an optical axis 11 and an image surface 12. The image capturing unit 10 includes three imaging elements 13 and a dual-shot injection-molded optical folding element 14. An imaging light (not shown) can pass through the imaging elements 13 and the dual-shot injection-molded optical folding element 14 along the optical axis 11 and then focus the image surface 12 to generate an optical imaging signal. The image sensor 105 is disposed on the image surface 12 so as to change the optical imaging signal into an electrical imaging signal.

Specifically, the imaging elements 13 includes a first imaging element 13a, a second imaging element 13b and a third imaging element 13c. The first imaging element 13a includes a first lens system 131a and a first retainer 132a. The first retainer 132a fixes the first lens system 131a to the dual-shot injection-molded optical folding element 14. The second imaging element 13b includes a second lens system 131b, a second retainer 132b and a second lens barrel 133b. The second lens system 131b is located in the second lens barrel 133b. The second retainer 132b is disposed at an image side of the second lens system 131b so as to fix the second lens system 131b in the second lens barrel 133b. The third imaging element 13c includes a third lens system 131c, a third retainer 132c and a third lens barrel 133c. The third lens system 131c is located in the third lens barrel 133c. The third retainer 132c is disposed at an image side of the third lens system 131c so as to fix the third lens system 131c in the third lens barrel 133c. Each of the first lens system 131a, the second lens system 131b and the third lens system 131c can be an imaging system formed by a lens element, a plurality of lens elements, a lens element cooperated with an aperture stop, or a plurality of lens elements cooperated with an aperture stop for the imaging light to pass through. In this embodiment, the first lens system 131a exemplarily includes one lens element, the second lens system 131b exemplarily includes a plurality of lens elements cooperated with an aperture stop, and the third lens system 131c exemplarily includes a plurality of lens elements, wherein some contours of the lens elements in the second lens system 131b and the third lens system 131c are omitted for simplicity. However, the present disclosure is not limited thereto. The dual-shot injection-molded optical folding element 14 has an optical path folding function. The dual-shot injection-molded optical folding element 14 is adjacent to the first imaging element 13a and the second imaging element 13b, wherein the first imaging element 13a is located at an object side of the dual-shot injection-molded optical folding element 14, while the second imaging element 13b is located at an image side of the dual-shot injection-molded optical folding element 14. The imaging light passes through the first imaging element 13a along the optical axis 11 and then is folded at the dual-shot injection-molded optical folding element 14. Then, the imaging light passes through the second imaging element 13b and the third imaging element 13c and then images on the image surface 12 for the image sensor 105 to change the optical imaging signal into the electrical imaging signal. Moreover, the third imaging element 13c is movable between the second imaging element 13b and the image surface 12 so as to adjust the focus on the image surface 12.

The dual-shot injection-molded optical folding element 14 includes a first part 14a and a second part 14b that are made in one piece by a dual-shot injection molding, wherein the first part 14a is made of transparent plastic material and has a first gate trace 140a, while the second part 14b is made of black opaque plastic material and has a second gate trace 140b.

The first part 14a further has an incident surface 141, an emitting surface 142 and a reflective surface 143 that are optical surfaces. The incident surface 141 faces an object side of the image capturing unit 10, is configured for the imaging light to pass through, and corresponds to the first imaging element 13a. The emitting surface 142 faces an image side of the image capturing unit 10, is configured for the imaging light to pass through, and corresponds to the second imaging element 13b. The reflective surface 143 is located between the incident surface 141 and the emitting surface 142, and the reflective surface 143 is configured to reflect the imaging light so as to provide the optical path folding function of the dual-shot injection-molded optical folding element 14, as the folded optical axis 11 shown in FIG. 2.

The second part 14b is fixed at a periphery of the first part 14a and is at least partially disposed on the incident surface 141 and the emitting surface 142. The second part 14b has two openings 146 at two sides thereof respectively corresponding to the incident surface 141 and the emitting surface 142. The openings 146 as two apertures define the light passable areas of the incident surface 141 and the emitting surface 142.

The second part 14b includes two supporting portions 147 that are configured to support the dual-shot injection-molded optical folding element 14, such that the dual-shot injection-molded optical folding element 14 is in physical contact with the first imaging element 13a and the second imaging element 13b respectively through the two supporting portions 147. In specific, the supporting portion 147 close to the incident surface 141 is connected to and abuts on the first imaging element 13a through mechanism assembly, and the other supporting portion 147 close to the emitting surface 142 is connected to and abuts on the second imaging element 13b through mechanism assembly. As such, the dual-shot injection-molded optical folding element 14 is maintained at an immovable predetermined position with respect to the first imaging element 13a and the second imaging element 13b. In this embodiment, the mechanism assembly is considered as a physical contact between the supporting portions 147 and the first retainer 132a of the first imaging element 13a and that between the supporting portions 147 and the second lens barrel 133b of the second imaging element 13b, but the present disclosure is not limited thereto.

The supporting portion 147 close to the object side surrounds an accommodation space S. The first lens system 131a is located in the accommodation space S. The first retainer 132a is located in the accommodation space S and is disposed at an object side of the first lens system 131a. The first retainer 132a abuts on the supporting portion 147 close to the object side so as to fix the first lens system 131a in the accommodation space S, such that the first imaging element 13a is maintained at an immovable predetermined position with respect to the dual-shot injection-molded optical folding element 14.

The supporting portion 147 close to the image side has an alignment structure 1471. The center of the dual-shot injection-molded optical folding element 14 is aligned with the center of the second imaging element 13b through the alignment structure 1471. In specific, the alignment structure 1471 has a planar surface 1471a and an inclined surface 1471b. The second lens barrel 133b has an alignment structure 1331b at an end thereof close to the object side. The planar surface 1471a and the inclined surface 1471b correspond to the shape of the alignment structure 1331b so as to be attached on the alignment structure 1331b of the second lens barrel 133b, thereby reducing the tilt and offset between the dual-shot injection-molded optical folding element 14 and the second lens barrel 133b of the second imaging element 13b. As such, the second imaging element 13b is maintained at an immovable predetermined position with respect to the dual-shot injection-molded optical folding element 14. In this embodiment, the second imaging element 13b is exemplarily aligned with the dual-shot injection-molded optical folding element 14 by designing the planar surface 1471a and the inclined surface 1471b of the alignment structure 1471 that correspond to the shape of the alignment structure 1331b, but the present disclosure is not limited thereto.

When a maximum field of view of the image capturing unit 10 is FOV, the following condition is satisfied: FOV=18.6 [deg.].

When an Abbe number of the first part 14a of the dual-shot injection-molded optical folding element 14 is V, the following condition is satisfied: V=56.

2nd Embodiment

Figure 8:
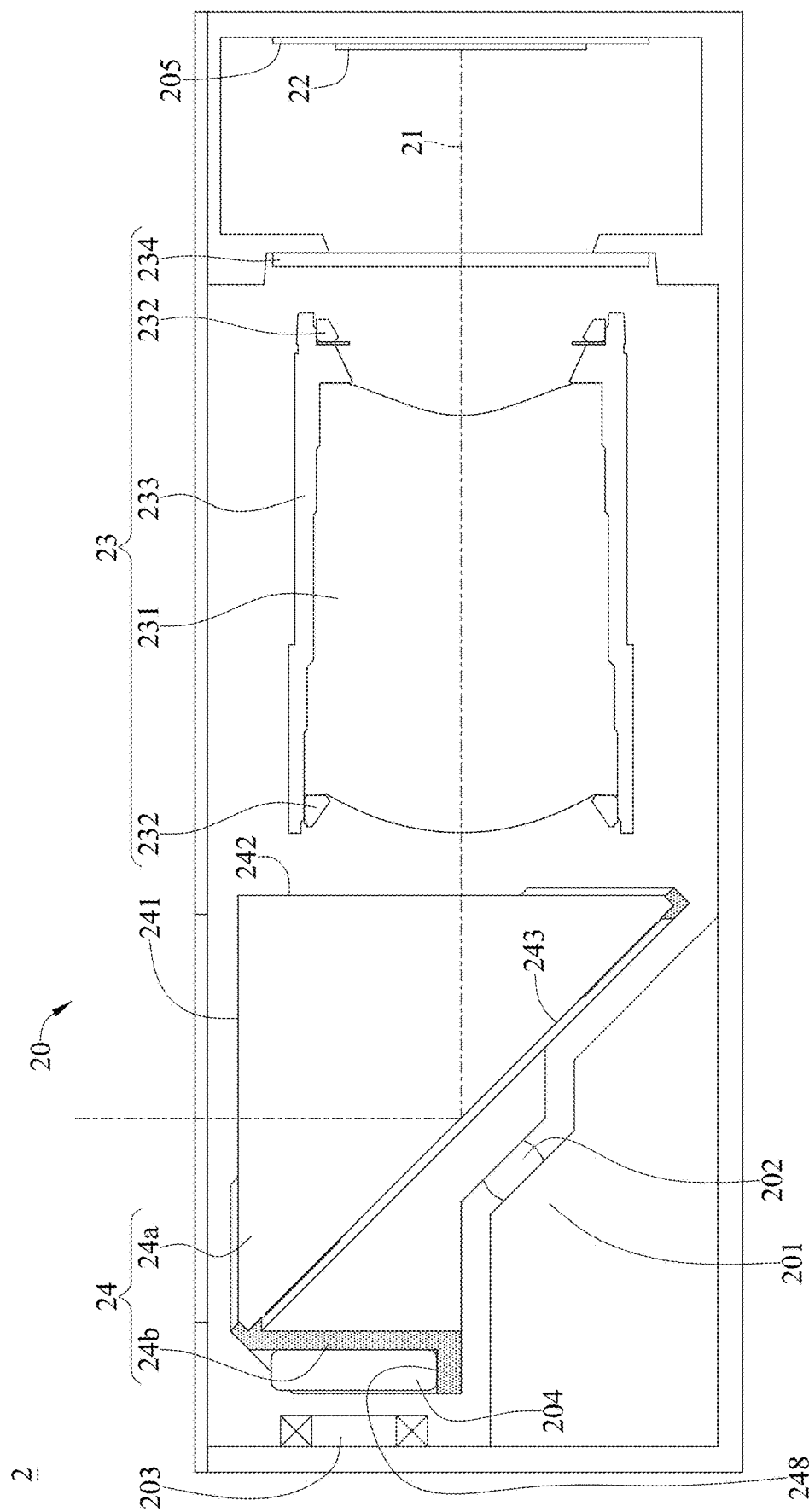
FIG. 8 is a cross-sectional view of a camera module according to the 2nd embodiment of the present disclosure.
Figure 9:
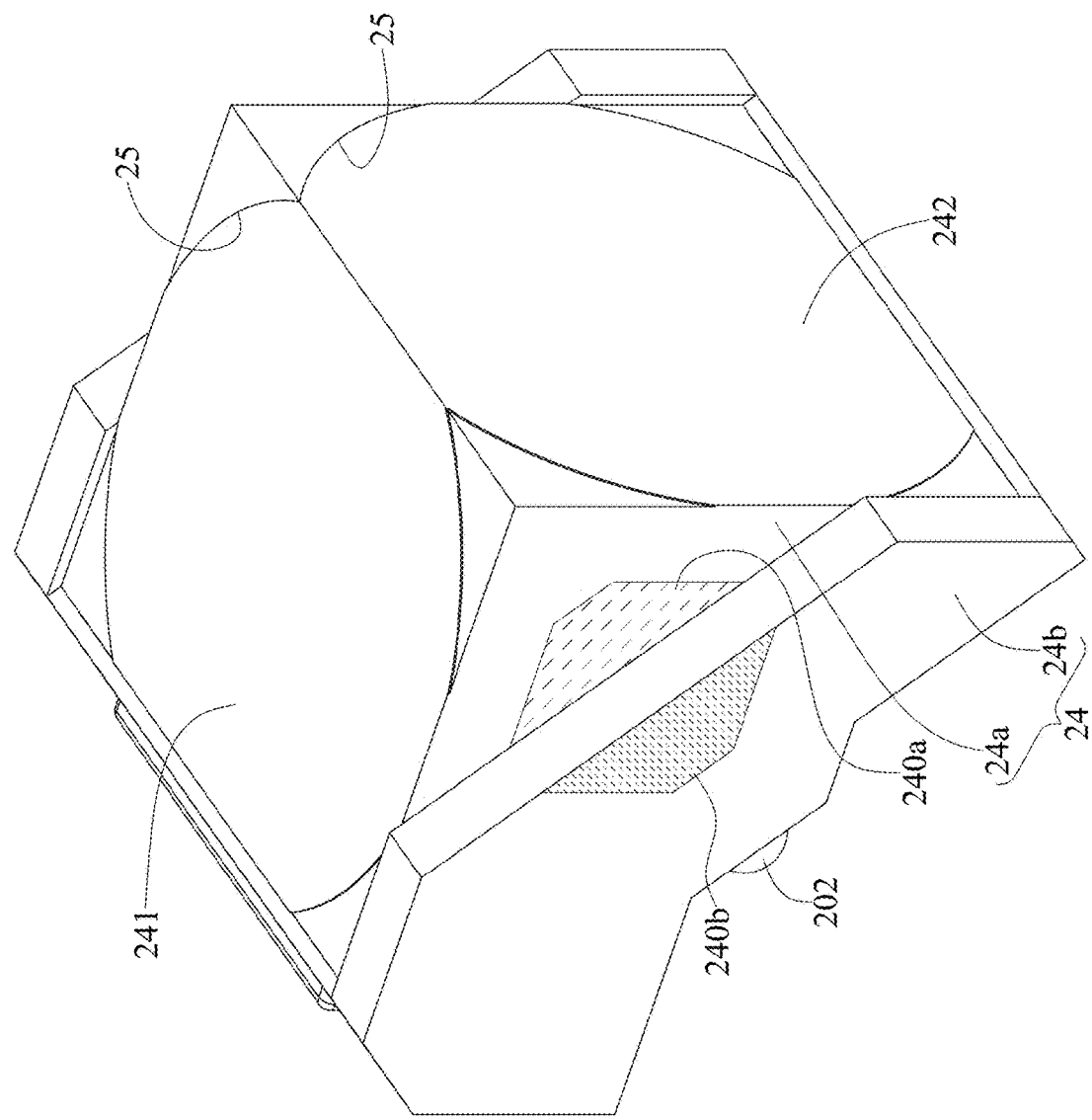
FIG. 9 is a perspective view of a partial image capturing unit of the camera module in FIG. 8.
Figure 10:
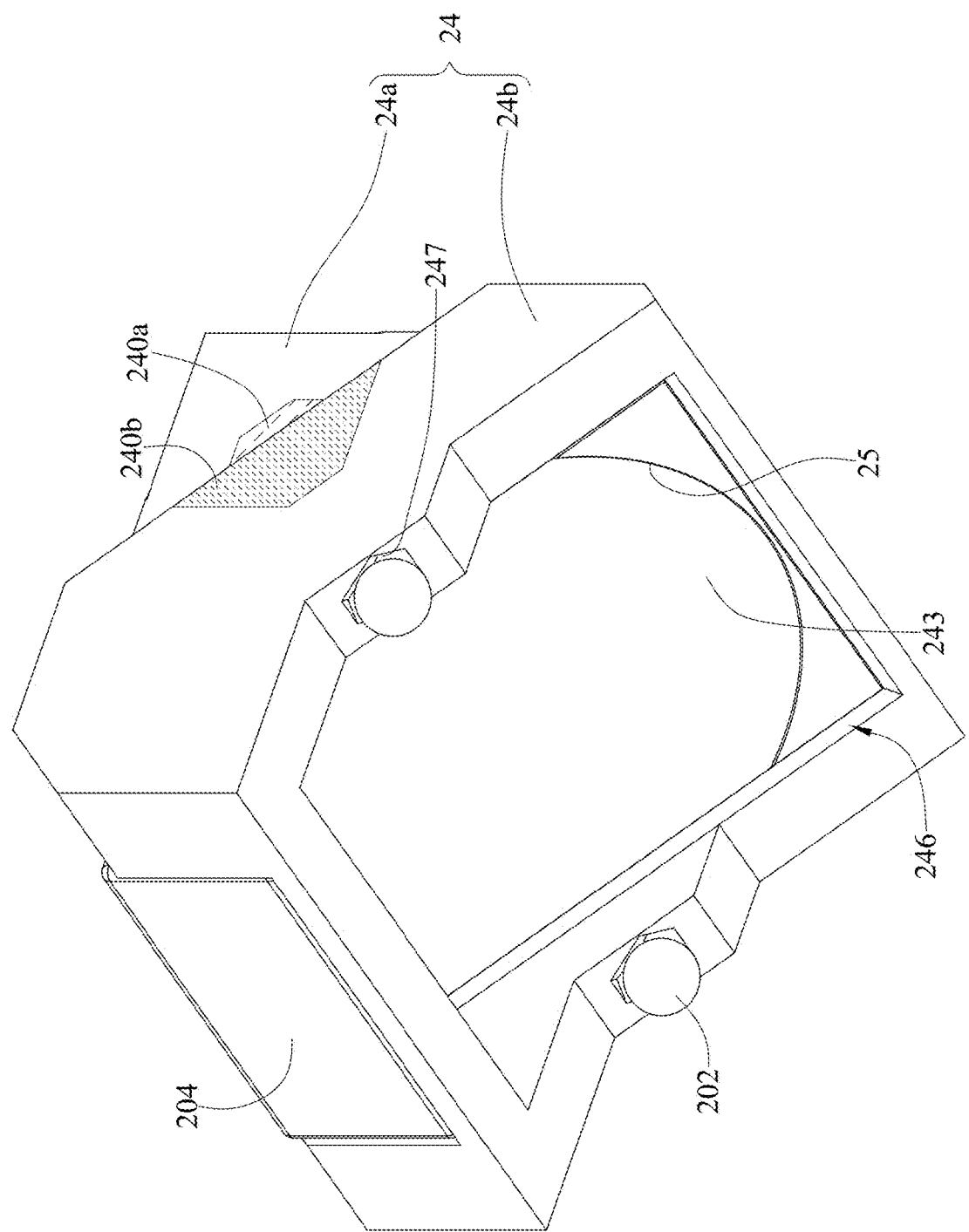
FIG. 10 is another perspective view of the partial image capturing unit of the camera module in FIG. 8.

Please refer to FIG. 8 to FIG. 10, where FIG. 8 is a cross-sectional view of a camera module according to the 2nd embodiment of the present disclosure, FIG. 9 is a perspective view of a partial image capturing unit of the camera module in FIG. 8, and FIG. 10 is another perspective view of the partial image capturing unit of the camera module in FIG. 8.

This embodiment provides a camera module 2 that includes a housing 201, a rotation component 202, a coil 203, a magnet 204, an image capturing unit 20 and an image sensor 205. The rotation component 202 is disposed on the housing 201. The coil 203 is disposed on the housing 201. The magnet 204 is adjacent to the coil 203 and disposed on the image capturing unit 20. The image capturing unit 20 is located in the housing 201 and is connected to the housing 201 via the rotation component 202.

The image capturing unit 20 has an optical axis 21 and an image surface 22. The image capturing unit 20 includes an imaging element 23 and a dual-shot injection-molded optical folding element 24. An imaging light (not shown) can sequentially pass through the dual-shot injection-molded optical folding element 24 and the imaging element 23 along the optical axis 21 and then focus the image surface 22 to generate an optical imaging signal. The image sensor 205 is disposed on the image surface 22 so as to change the optical imaging signal into an electrical imaging signal.

Specifically, the imaging element 23 includes a lens system 231, two retainers 232, a lens barrel 233 and a filter 234. The lens system 231 is located in the lens barrel 233. The lens system 231 can be an imaging system formed by a lens element, a plurality of lens elements, a lens element cooperated with an aperture stop, or a plurality of lens elements cooperated with an aperture stop for the imaging light to pass through. In this embodiment, the lens system 231 exemplarily includes a plurality of lens elements cooperated with an aperture stop, wherein some contours of the lens elements in the lens system 231 are omitted for simplicity. However, the present disclosure is not limited thereto. The retainers 232 are respectively disposed at an object side and an image side of the lens system 231 so as to fix the lens system 231 in the lens barrel 233. The filter 234 is disposed between the lens system 231 and the image surface 22 so as to filter light with a specific wavelength. The dual-shot injection-molded optical folding element 24 has an optical path folding function. The dual-shot injection-molded optical folding element 24 is adjacent to an object side of the imaging element 23. The imaging light enters into the dual-shot injection-molded optical folding element 24 along the optical axis 21 and then is folded at the dual-shot injection-molded optical folding element 24. Then, the imaging light passes through the imaging element 23 and then images on the image surface 22 for the image sensor 205 to change the optical imaging signal into the electrical imaging signal.

The dual-shot injection-molded optical folding element 24 includes a first part 24a and a second part 24b that are made in one piece by a dual-shot injection molding, wherein the first part 24a is made of transparent plastic material and has a first gate trace 240a, while the second part 24b is made of black opaque plastic material and has a second gate trace 240b.

The first part 24a further has an incident surface 241, an emitting surface 242 and a reflective surface 243 that are optical surfaces. The incident surface 241 faces an object side of the image capturing unit 20 and is configured for the imaging light to pass through. The emitting surface 242 faces an image side of the image capturing unit 20, is configured for the imaging light to pass through, and corresponds to the imaging element 23. The reflective surface 243 is located between the incident surface 241 and the emitting surface 242, and the reflective surface 243 is configured to reflect the imaging light so as to provide the optical path folding function of the dual-shot injection-molded optical folding element 24, as the folded optical axis 21 shown in FIG. 8.

The second part 24b is fixed at a periphery of the first part 24a and is at least partially disposed on the reflective surface 243. The second part 24b has an opening 246 at a side thereof corresponding to the reflective surface 243. The second part 24b includes a supporting portion 247 that is configured to support the dual-shot injection-molded optical folding element 24, such that the dual-shot injection-molded optical folding element 24 is in physical contact with the rotation component 202 through the supporting portion 247. In specific, the rotation component 202 may be a ball, and the supporting portion 247 is connected to and abuts on the rotation component 202 through mechanism assembly so as to support the dual-shot injection-molded optical folding element 24. As such, the dual-shot injection-molded optical folding element 24 is pivotable within a corresponding range of a predetermined position by taking the rotation component 202 as a pivoting center, and the dual-shot injection-molded optical folding element 24 corresponds to the imaging element 23, thereby adjusting the imaging position of the imaging light on the image surface 22. In this embodiment, the rotation component 202 is exemplarily a ball for enabling the pivoting of the dual-shot injection-molded optical folding element 24, but the present disclosure is not limited thereto. Further, in this embodiment, the mechanism assembly is considered as a point contact between the inner surface of the supporting portion 247 and the rotation component 202 of a ball shape, but the present disclosure is not limited thereto.

The second part 24b further has an accommodating recess 248. The magnet 204 is disposed in the accommodating recess 248. The magnet 204 corresponds to the coil 203, such that the magnet 204 can be driven by the coil 203 to pivot the dual-shot injection-molded optical folding element 24. However, the present disclosure is not limited thereto. In some other embodiments, the coil may be disposed in the accommodating recess, and the magnet may be correspondingly disposed on the housing.

The imaging capturing unit 20 further includes three arc-shaped step structures 25 that are respectively disposed on the incident surface 241, the emitting surface 242 and the reflective surface 243. Two arc-shaped step structures located on the incident surface 241 and the emitting surface 242 are protruded step structures, while the other one arc-shaped step structure 25 located on the reflective surface 243 is recessed step structure. However, the present disclosure is not limited thereto. The arc-shaped step structures 25 each have a plurality of arc-shaped contours formed by taking the geometric centers of the incident surface 241, the emitting surface 242 and the reflective surface 243 as the center points thereof, and the arc-shaped contours are spaced apart from one another. However, the present disclosure is not limited thereto. In some other embodiments, the arc-shaped structures may have whole circular contours formed by taking the geometric centers of the incident surface, the emitting surface and the reflective surface as the center points thereof.

When a maximum field of view of the image capturing unit 20 is FOV, the following condition is satisfied: FOV=26.9 [deg.].

When an Abbe number of the first part 24a of the dual-shot injection-molded optical folding element 24 is V, the following condition is satisfied: V=64.2.

3rd Embodiment

Figure 11:
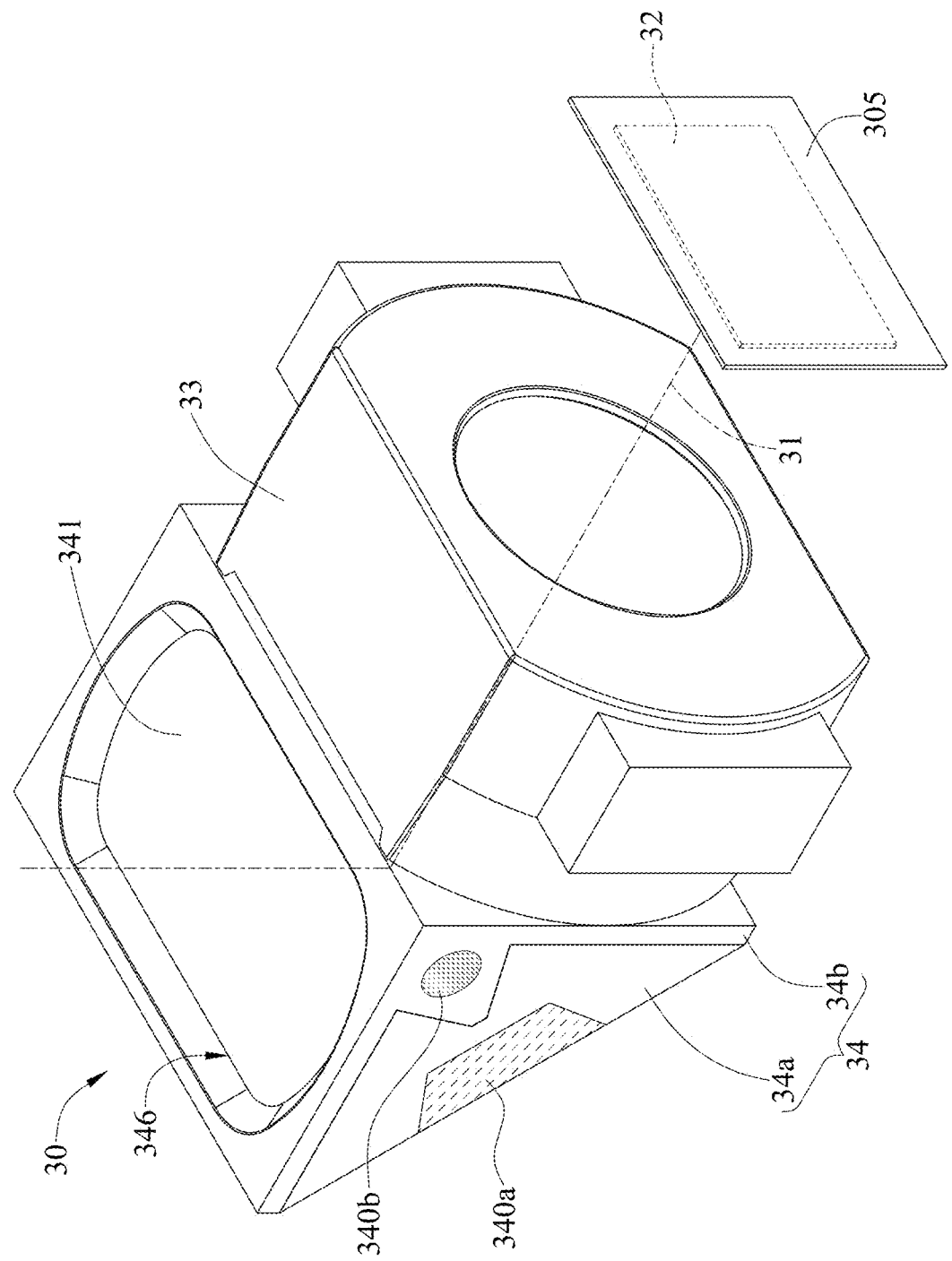
FIG. 11 is a perspective view of a camera module according to the 3rd embodiment of the present disclosure.
Figure 12:
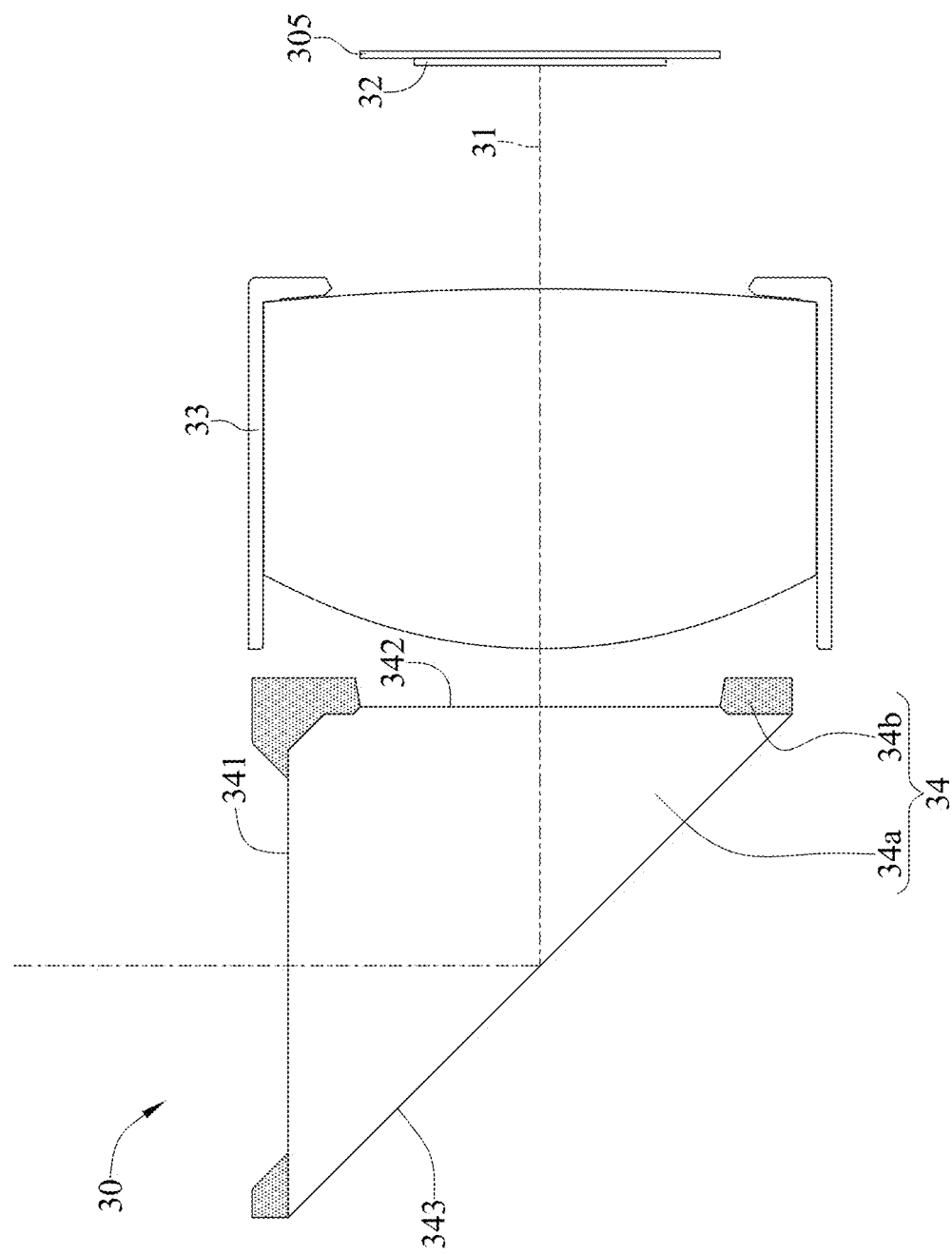
FIG. 12 is a cross-sectional view of the camera module in FIG. 11.
Figure 13:
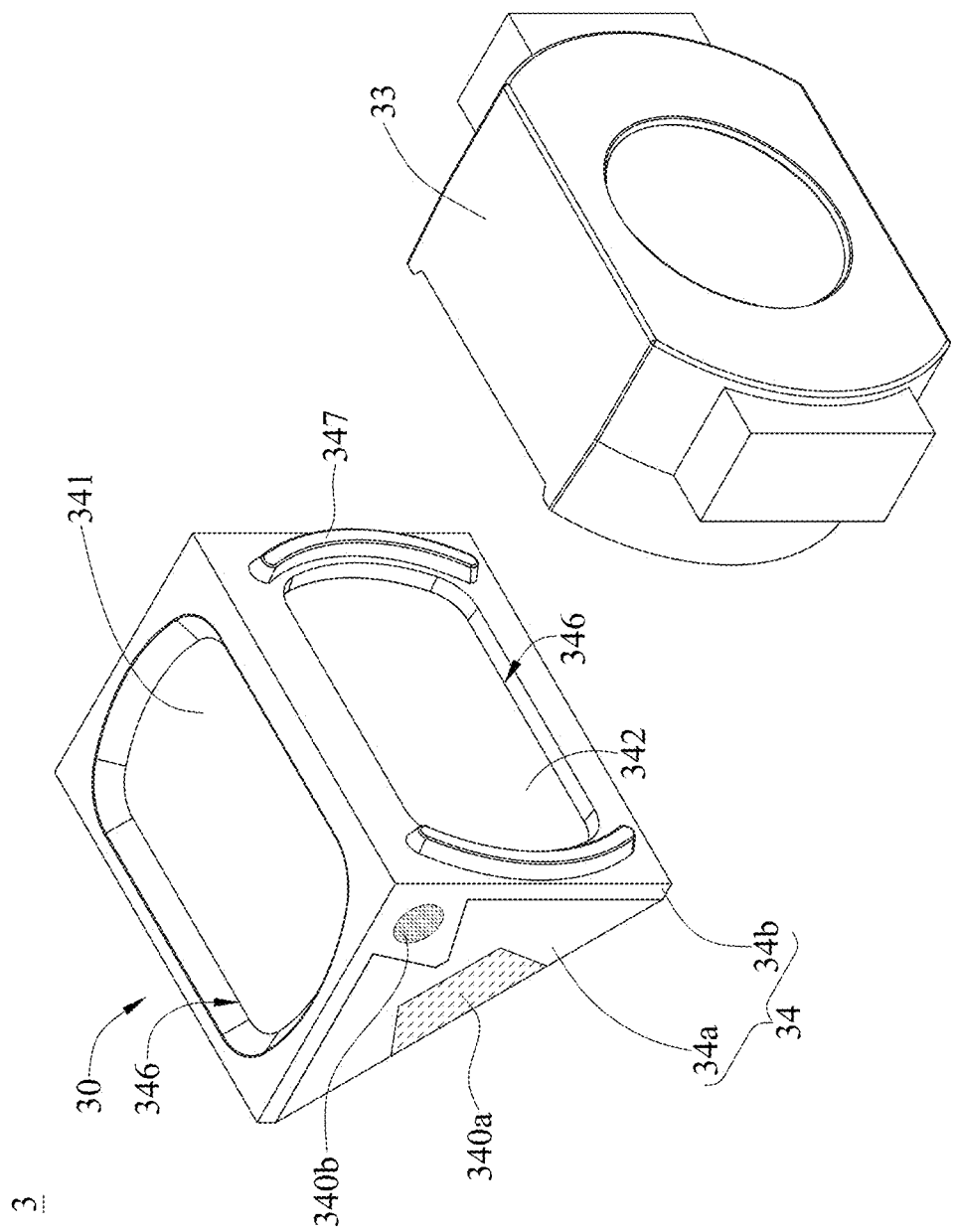
FIG. 13 is an exploded view of the partial camera module in FIG. 11.
Figure 14:
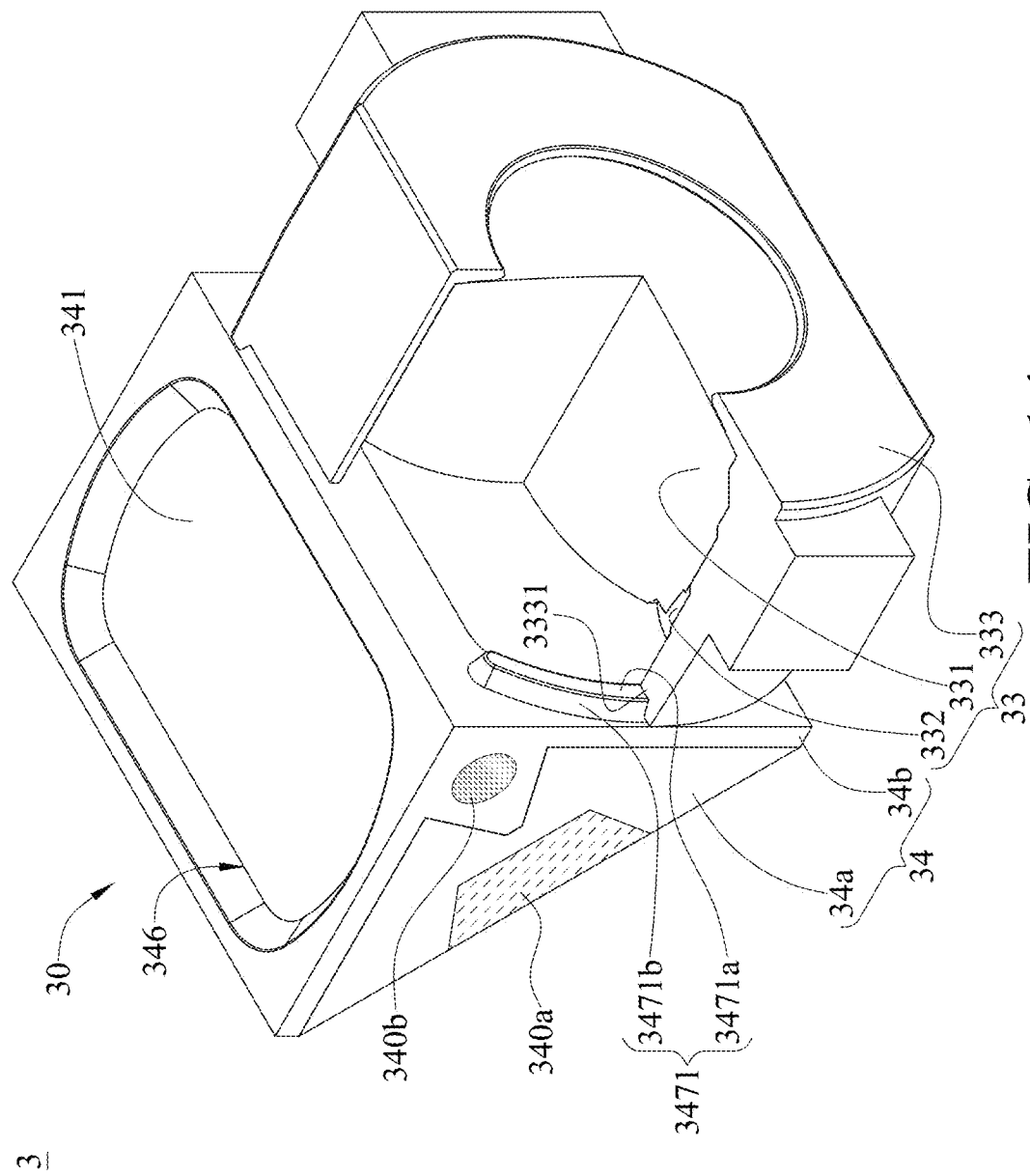
FIG. 14 is a perspective view of the partial camera module in FIG. 11 where an imaging element thereof is partially sectioned.
Figure 15:
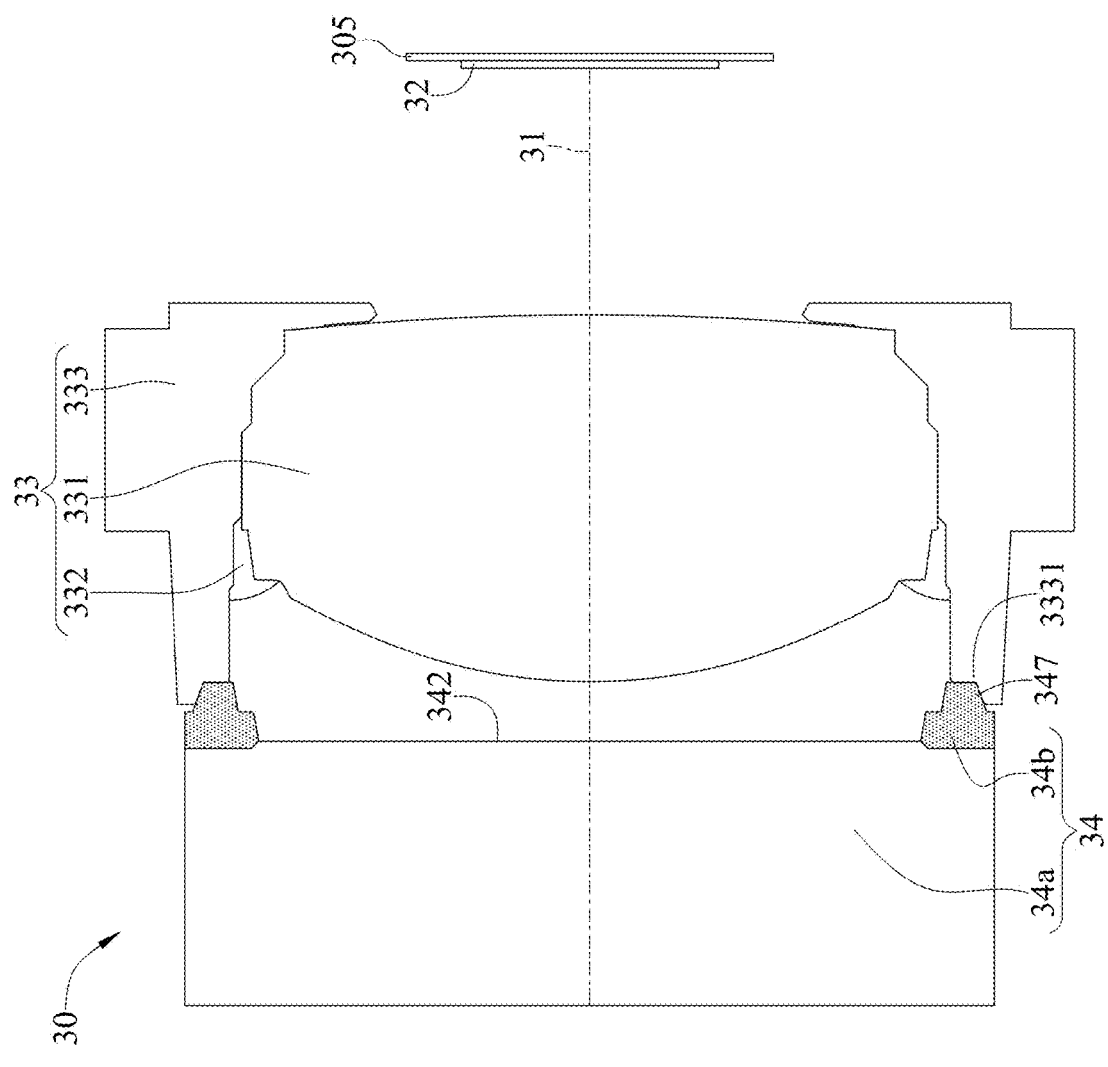
FIG. 15 is another cross-sectional view of the camera module in FIG. 11 viewing from a top side.
Figure 16:
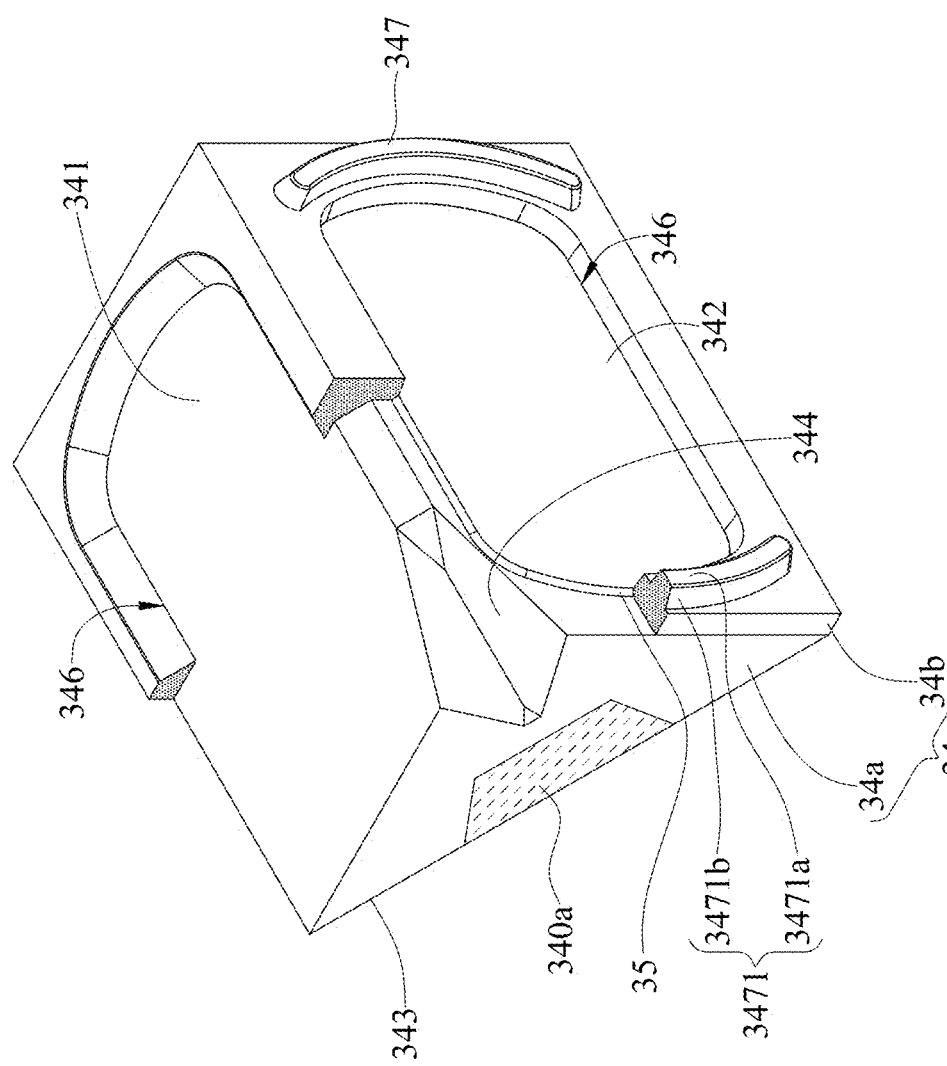
FIG. 16 is a perspective view of a partially sectioned dual-shot injection-molded optical folding element of the camera module in FIG. 11.

Please refer to FIG. 11 to FIG. 16, where FIG. 11 is a perspective view of a camera module according to the 3rd embodiment of the present disclosure, FIG. 12 is a cross-sectional view of the camera module in FIG. 11, FIG. 13 is an exploded view of the partial camera module in FIG. 11, FIG. 14 is a perspective view of the partial camera module in FIG. 11 where an imaging element thereof is partially sectioned, FIG. 15 is another cross-sectional view of the camera module in FIG. 11 viewing from a top side, and FIG. 16 is a perspective view of a partially sectioned dual-shot injection-molded optical folding element of the camera module in FIG. 11.

This embodiment provides a camera module 3 that includes a housing (not shown), an image capturing unit 30 and an image sensor 305. The image capturing unit 30 is disposed in the housing. The image capturing unit 30 has an optical axis 31 and an image surface 32. The image capturing unit 30 includes three imaging element 33 and a dual-shot injection-molded optical folding element 34. An imaging light (not shown) can sequentially pass through the dual-shot injection-molded optical folding element 34 and the imaging element 33 along the optical axis 31 and then focus the image surface 32 to generate an optical imaging signal. The image sensor 305 is disposed on the image surface 32 so as to change the optical imaging signal into an electrical imaging signal.

Specifically, the imaging element 33 includes a lens system 331, two retainers 332 and a lens barrel 333. The lens system 331 is located in the lens barrel 333. The retainers 332 are disposed at an object side of the lens system 331 so as to fix the lens system 331 in the lens barrel 333. The lens system 331 can be an imaging system formed by a lens element, a plurality of lens elements, a lens element cooperated with an aperture stop, or a plurality of lens elements cooperated with an aperture stop for the imaging light to pass through. In this embodiment, the lens system 331 exemplarily includes a plurality of lens elements, wherein some contours of the lens elements in the lens system 331 are omitted for simplicity. However, the present disclosure is not limited thereto. In this embodiment, the lens barrel 333 has two opposite trimmed edges (not numbered) and thus is non-circular, and the lens system 331 and the retainers 332 are also non-circular for corresponding to the non-circular lens barrel 333, wherein the retainers 332 are two arc-shaped bodies formed by cutting a circular retainer, and the retainers 332 in this embodiment are presented as two pieces. However, the present disclosure is not limited thereto. In some other embodiments, the retainers can also be two arc-shaped bodies formed by curing liquid curable material. The dual-shot injection-molded optical folding element 34 has an optical path folding function. The dual-shot injection-molded optical folding element 34 is adjacent to an object side of the imaging element 33. The imaging light enters into the dual-shot injection-molded optical folding element 34 along the optical axis 31 and then is folded at the dual-shot injection-molded optical folding element 34. Then, the imaging light passes through the imaging element 33 and then images on the image surface 32 for the image sensor 305 to change the optical imaging signal into the electrical imaging signal.

The dual-shot injection-molded optical folding element 34 includes a first part 34a and a second part 34b that are made in one piece by a dual-shot injection molding, wherein the first part 34a is made of transparent plastic material and has a first gate trace 340a, while the second part 34b is made of black opaque plastic material and has a second gate trace 340b.

The first part 34a further has an incident surface 341, an emitting surface 342, a reflective surface 343 and a recessed structure 344, wherein the incident surface 341, the emitting surface 342 and the reflective surface 343 are optical surfaces. The incident surface 341 faces an object side of the image capturing unit 30 and is configured for the imaging light to pass through. The emitting surface 342 faces an image side of the image capturing unit 30, is configured for the imaging light to pass through, and corresponds to the imaging element 33. The reflective surface 343 is located between the incident surface 341 and the emitting surface 342, and the reflective surface 343 is configured to reflect the imaging light so as to provide the optical path folding function of the dual-shot injection-molded optical folding element 34, as the folded optical axis 31 shown in FIG. 12. The recessed structure 344 is located at a side that is opposite to the reflective surface 343 and between the incident surface 341 and the emitting surface 342. The recessed structure 344 is recessed from the outer side to the inner side of the first part 34a (i.e., along a direction towards the reflective surface 343).

The second part 34b is fixed at a periphery of the first part 34a, partially filled in the recessed structure 344, and at least partially disposed on the incident surface 341 and the emitting surface 342. The second part 34b has two non-circular openings 346 at two sides thereof respectively corresponding to the incident surface 341 and the emitting surface 342. Specifically, the openings 346 each have two arc-shaped edges (not numbered) and two trimmed edges (not numbered) connected to and located between the arc-shaped edges. The openings 346 as two apertures define the light passable areas of the incident surface 341 and the emitting surface 342.

The second part 34b includes a supporting portion 347 that is configured to support the dual-shot injection-molded optical folding element 34, such that the dual-shot injection-molded optical folding element 34 is in physical contact with the imaging element 33 through the supporting portion 347. In specific, the supporting portion 347 is connected to and abuts on the imaging element 33 through mechanism assembly. As such, the dual-shot injection-molded optical folding element 34 is maintained at an immovable predetermined position with respect to the imaging element 33. In this embodiment, the mechanism assembly is considered as a physical contact between the supporting portion 347 and the lens barrel 333 of the imaging element 33, but the present disclosure is not limited thereto.

The supporting portion 347 has an alignment structure 3471. The center of the dual-shot injection-molded optical folding element 34 is aligned with the center of the imaging element 33 through the alignment structure 3471. In specific, the alignment structure 3471 has a planar surface 3471a and an inclined surface 3471b. The lens barrel 333 has an alignment structure 3331 at an end thereof close to the object side. The planar surface 3471a and the inclined surface 3471b correspond to the shape of the alignment structure 3331 so as to be attached on the alignment structure 3331 of the lens barrel 333, thereby reducing the tilt and offset between the dual-shot injection-molded optical folding element 34 and the lens barrel 333 of the imaging element 33. As such, the imaging element 33 is maintained at an immovable predetermined position with respect to the dual-shot injection-molded optical folding element 34. In this embodiment, the imaging element 33 is exemplarily aligned with the dual-shot injection-molded optical folding element 34 by designing the planar surface 3471a and the inclined surface 3471b of the alignment structure 3471 that correspond to the shape of the alignment structure 3331, but the present disclosure is not limited thereto.

The image capturing unit 30 further includes an arc-shaped step structure 35 that is disposed on the emitting surface 342. The arc-shaped step structure 35 is a protruded step structure. The arc-shaped step structure 35 has a plurality of arc-shaped contours formed by taking the geometric center of the emitting surface 342 as the center point thereof, and the arc-shaped contours are spaced apart from one another.

When a maximum field of view of the image capturing unit 30 is FOV, the following condition is satisfied: FOV=10.1 [deg.].

When an Abbe number of the first part 34a of the dual-shot injection-molded optical folding element 34 is V, the following condition is satisfied: V=44.3.

4th Embodiment

Figure 17:
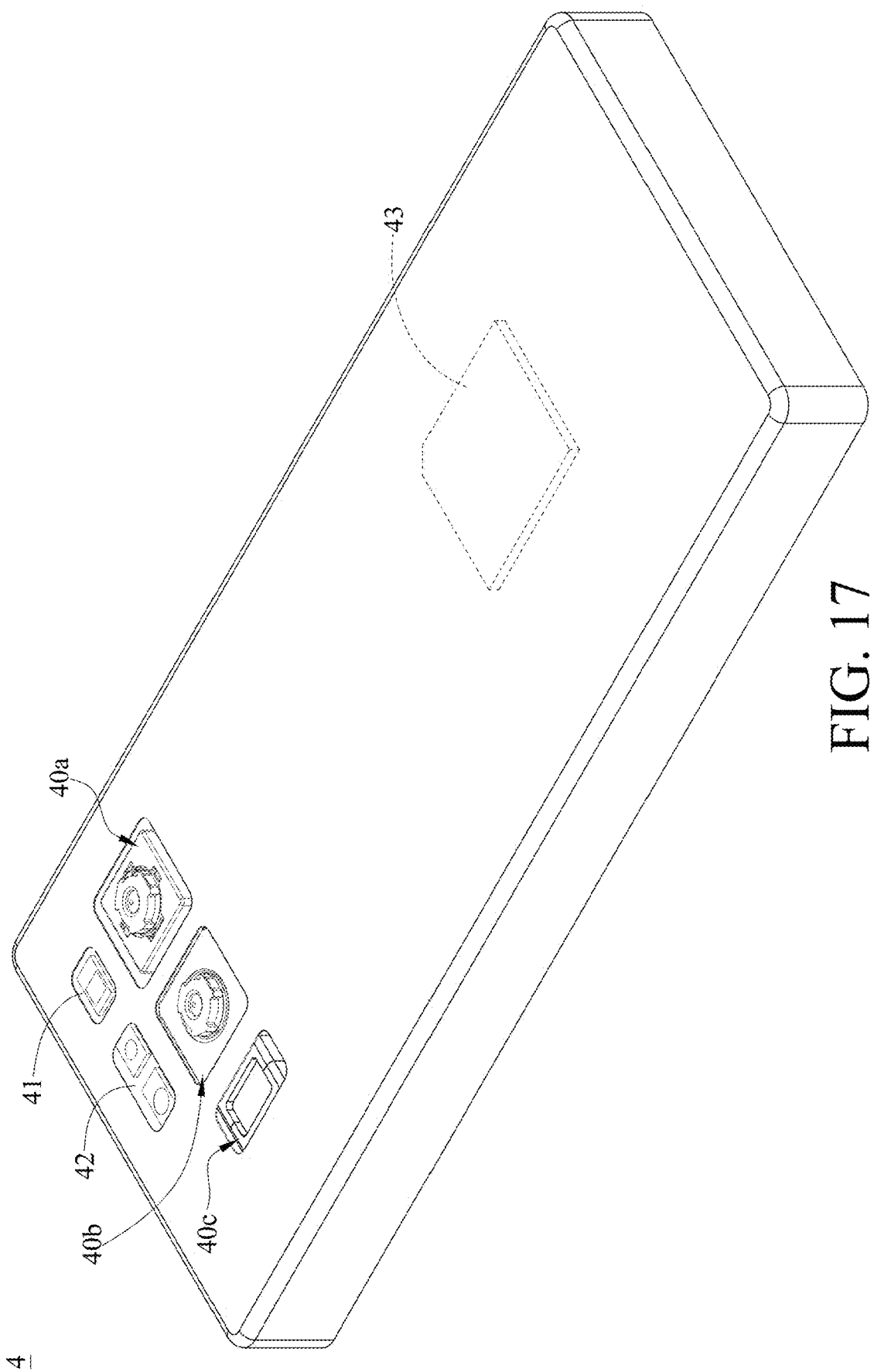
FIG. 17 is a perspective view of an electronic device according to the 4th embodiment of the present disclosure.
Figure 18:
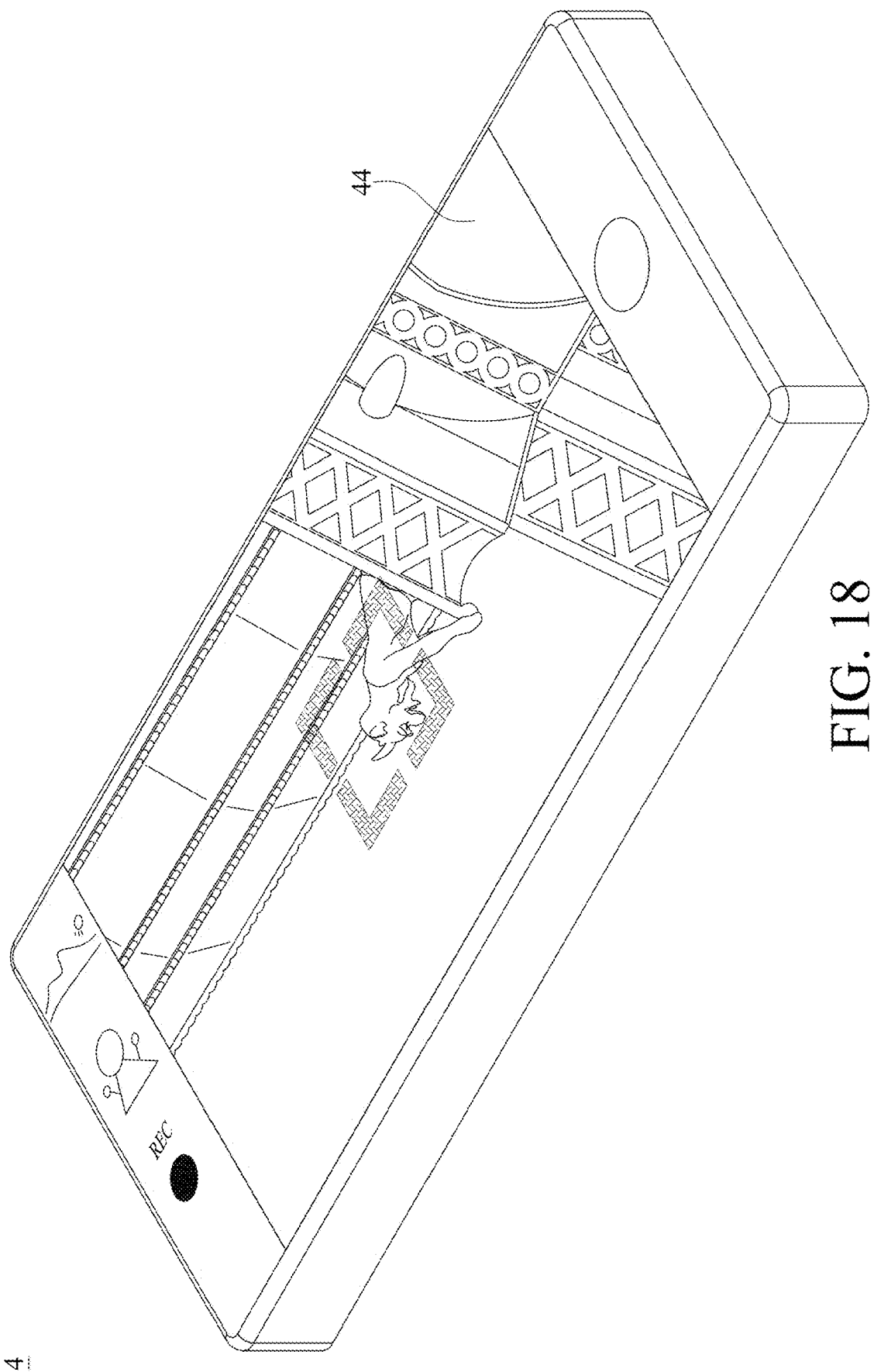
FIG. 18 is another perspective view of the electronic device in FIG. 17.

Please refer to FIG. 17 and FIG. 18, wherein FIG. 17 is a perspective view of an electronic device according to the 4th embodiment of the present disclosure, and FIG. 18 is another perspective view of the electronic device in FIG. 17.

In this embodiment, an electronic device 4 is a smartphone including a plurality of camera modules, a flash module 41, a focus assist module 42, an image signal processor 43, a display module (user interface) 44 and an image software processor (not shown).

The camera modules include an ultra-wide-angle camera module 40a, a high pixel camera module 40b and a telephoto camera module 40c. The camera module 1 disclosed in the 1st embodiment is taken as the telephoto camera module 40c, but the present disclosure is not limited thereto. Camera modules disclosed in other embodiments can also be taken as the telephoto camera module 40c.

Figure 19:
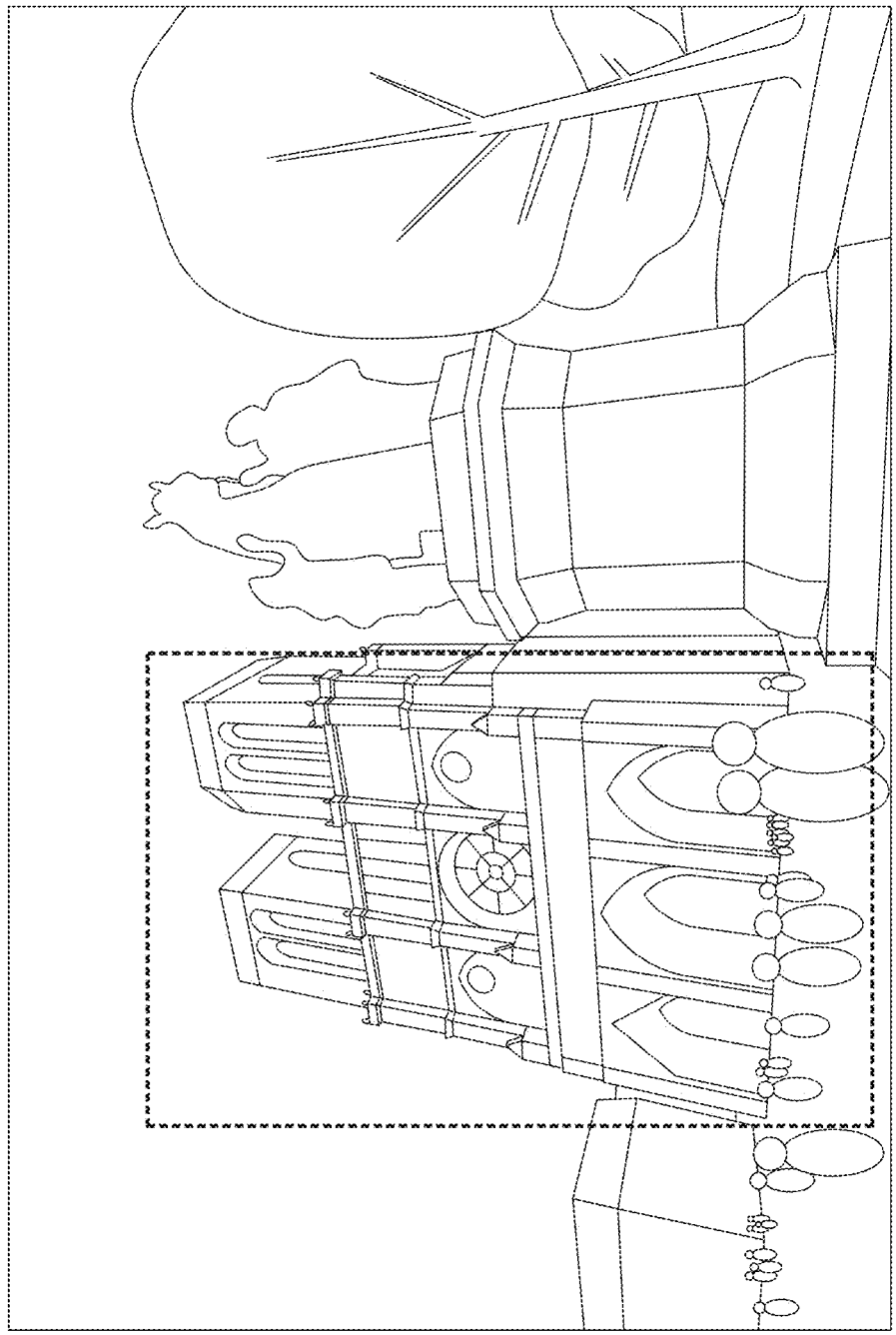
FIG. 19 is an image captured by an ultra-wide-angle camera module.

The image captured by the ultra-wide-angle camera module 40a enjoys a feature of multiple imaged objects. FIG. 19 is an image captured by the ultra-wide-angle camera module 40a.

Figure 20:
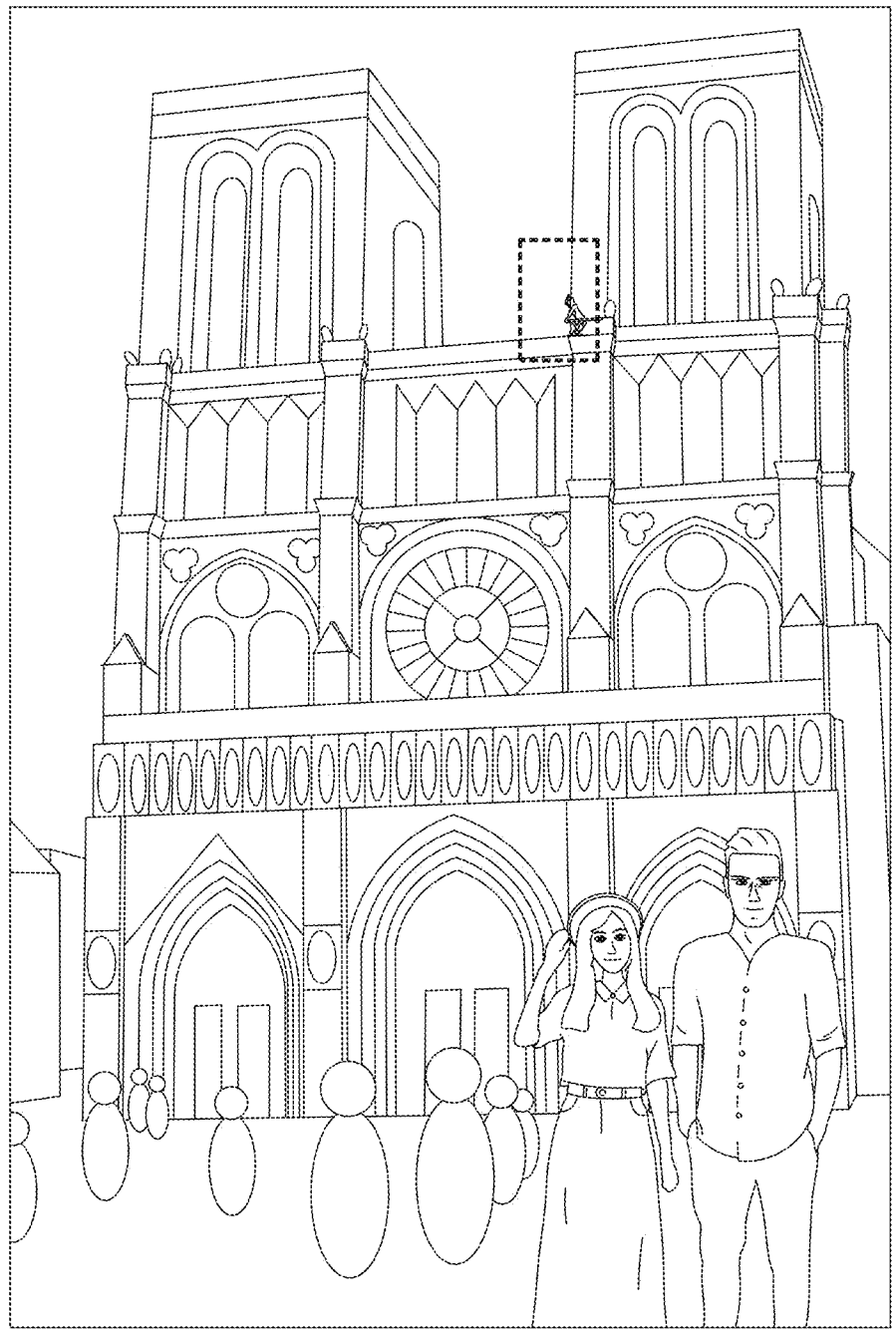
FIG. 20 is an image captured by a high pixel camera module.

The image captured by the high pixel camera module 40b enjoys a feature of high resolution and less distortion, and the high pixel camera module 40b can capture part of the image in FIG. 19. FIG. 20 is an image captured by the high pixel camera module 40b.

Figure 21:
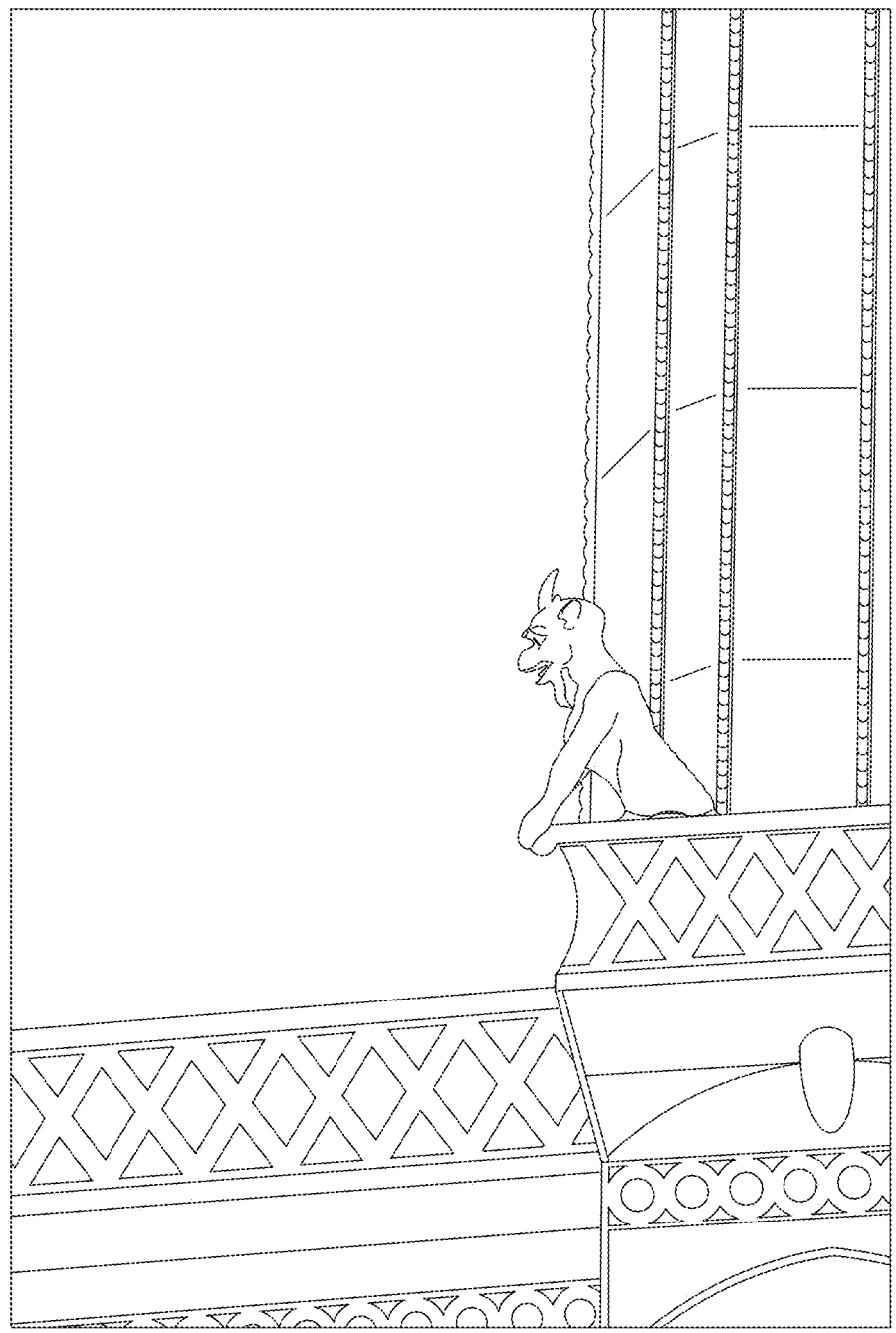
FIG. 21 is an image captured by a telephoto camera module.

The image captured by the telephoto camera module 40c enjoys a feature of high optical magnification, and the telephoto camera module 40c can capture part of the image in FIG. 20. FIG. 21 is an image captured by the telephoto camera module 40c. The maximum field of view (FOV) of the camera module 1 corresponds to the field of view in FIG. 21.

When a user captures images of an object, the light rays converge in the ultra-wide-angle camera module 40a, the high pixel camera module 40b or the telephoto camera module 40c to generate images, and the flash module 41 is activated for light supplement. The focus assist module 42 detects the object distance of the imaged object to achieve fast auto focusing. The image signal processor 43 is configured to optimize the captured image to improve image quality and provided zooming function. The light beam emitted from the focus assist module 42 can be either conventional infrared or laser. The display module 44 can include a touch screen, and the user is able to interact with the display module 44 and the image software processor having multiple functions to capture images and complete image processing. Alternatively, the user may capture images via a physical button. The image processed by the image software processor can be displayed on the display module 44.

5th Embodiment

Figure 22:
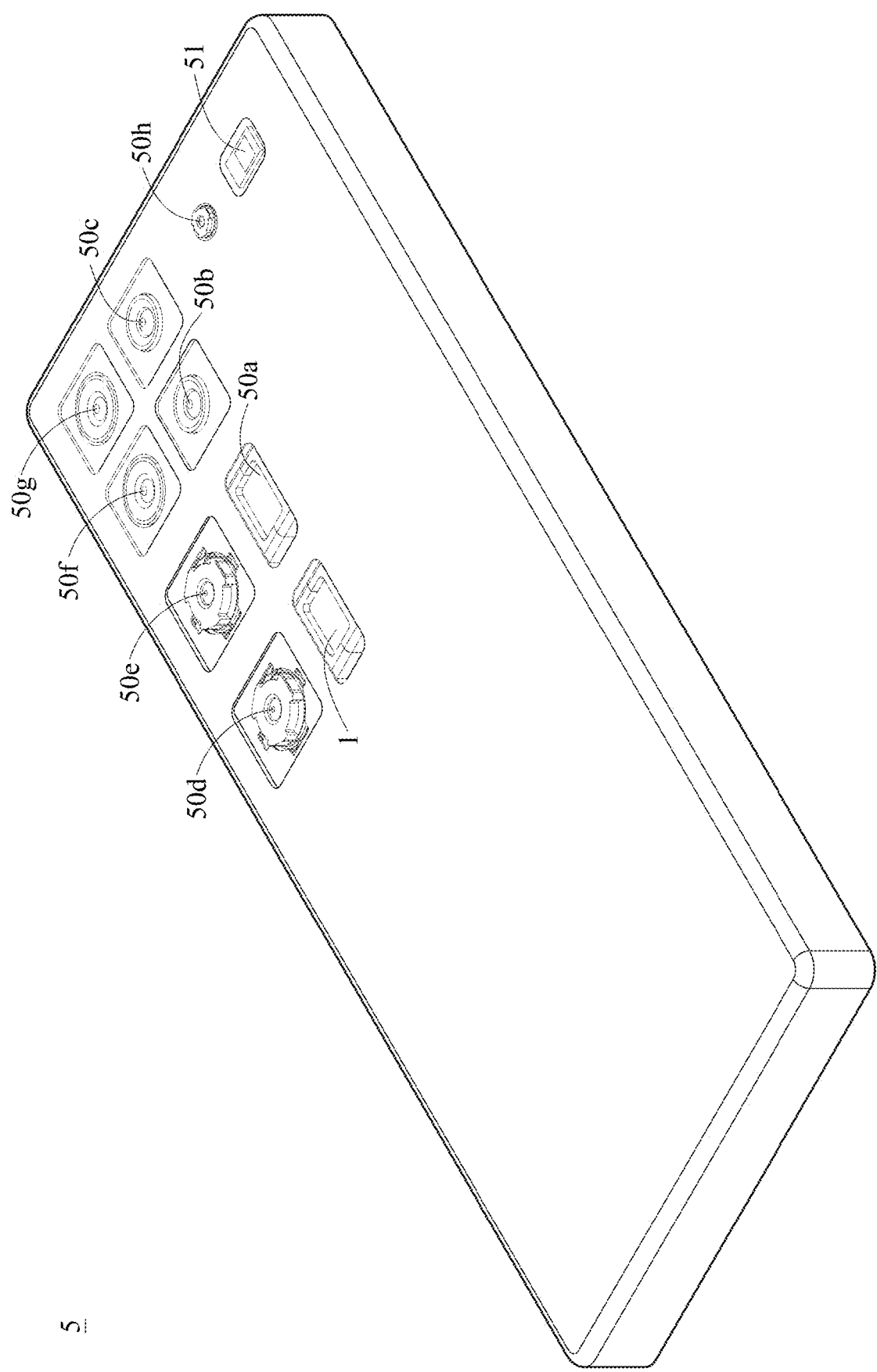
FIG. 22 is a perspective view of an electronic device according to the 5th embodiment of the present disclosure.

Please refer to FIG. 22, which is a perspective view of an electronic device according to the 5th embodiment of the present disclosure.

In this embodiment, an electronic device 5 is a smartphone including the camera module 1 disclosed in the 1st embodiment, a camera module 50a, a camera module 50b, a camera module 50c, a camera module 50d, a camera module 50e, a camera module 50f, a camera module 50g, a camera module 50h, a flash module 51, an image signal processor, a display module and an image software processor (not shown). The camera module 1, the camera module 50a, the camera module 50b, the camera module 50c, the camera module 50d, the camera module 50e, the camera module 50f, the camera module 50g and the camera module 50h are disposed on the same side of the electronic device 5, while the display module is disposed on the opposite side of the electronic device 5.

The camera module 1 is a telephoto camera module, the camera module 50a is a telephoto camera module, the camera module 50b is a telephoto camera module, the camera module 50c is a telephoto camera module, the camera module 50d is a wide-angle camera module, the camera module 50e is a wide-angle camera module, the camera module 50f is an ultra-wide-angle camera module, the camera module 50g is an ultra-wide-angle camera module, and the camera module 50h is a ToF (time of flight) camera module. In this embodiment, the camera module 1, the camera module 50a, the camera module 50b, the camera module 50c, the camera module 50d, the camera module 50e, the camera module 50f and the camera module 50g have different fields of view, such that the electronic device 5 can have various magnification ratios so as to meet the requirement of optical zoom functionality. In addition, the camera module 1 and the camera module 50a are telephoto camera modules having an optical folding component configuration. In addition, the camera module 50h can determine depth information of the imaged object. In this embodiment, the electronic device 5 includes a plurality of camera modules 1, 50a, 50b, 50c, 50d, 50e, 50f, 50g, and 50h, but the present disclosure is not limited to the number and arrangement of camera module. When a user captures images of an object, the light rays converge in the camera modules 1, 50a, 50b, 50c, 50d, 50e, 50f, 50g or 50h to generate an image(s), and the flash module 51 is activated for light supplement. Further, the subsequent processes are performed in a manner similar to the abovementioned embodiments, so the details in this regard will not be provided again.

The smartphones in the embodiments are only exemplary for showing the image capturing unit and the camera module of the present disclosure installed in an electronic device, and the present disclosure is not limited thereto. The image capturing unit and the camera module can be optionally applied to optical systems with a movable focus. Furthermore, the image capturing unit and the camera module feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing unit, comprising:
   at least one imaging element, configured for an imaging light to pass through; and
   a dual-shot injection-molded optical folding element, adjacent to the at least one imaging element, and the dual-shot injection-molded optical folding element comprising:
   a first part, made of transparent material, wherein the first part has:
   an incident surface, facing an object side and configured for the imaging light to pass through;
   an emitting surface, facing an image side and configured for the imaging light to pass through; and
   a reflective surface, located between the incident surface and the emitting surface and configured to reflect the imaging light; and
   a second part, made of opaque material, wherein the second part is fixed at a periphery of the first part, the second part of the dual-shot injection-molded optical folding element is disposed on at least one surface of the incident surface, the emitting surface and the reflective surface, and the second part has at least one opening at a side thereof corresponding to and surrounding to the at least one surface, and the second part comprises:
   a supporting portion, configured to support the dual-shot injection-molded optical folding element, wherein the supporting portion maintains the dual-shot injection-molded optical folding element at a predetermined position corresponding to the at least one imaging element through mechanism assembly;
   wherein each of the first part and the second part has at least one gate trace, and the at least one gate trace of the first part and the at least one gate trace of the second part are disposed adjacent to each other;
   wherein an Abbe number of the first part of the dual-shot injection-molded optical folding element is V, and the following condition is satisfied:

40≤V≤65.

2. The image capturing unit according to claim 1, wherein the dual-shot injection-molded optical folding element is one piece made by a dual-shot injection molding.

3. The image capturing unit according to claim 1, wherein the at least one opening is non-circular.

4. The image capturing unit according to claim 1, wherein the supporting portion and the at least one imaging element abut to each other.

5. The image capturing unit according to claim 4, wherein the at least one imaging element is located at an object side of the dual-shot injection-molded optical folding element, and the at least one imaging element and the incident surface correspond to each other.

6. The image capturing unit according to claim 4, wherein the at least one imaging element is located at an image side of the dual-shot injection-molded optical folding element, and the at least one imaging element and the emitting surface correspond to each other.

7. The image capturing unit according to claim 4, wherein the supporting portion has an alignment structure, and a center of the dual-shot injection-molded optical folding element is aligned with a center of the at least one imaging element through the alignment structure.

8. The image capturing unit according to claim 7, wherein the alignment structure has a planar surface and an inclined surface that are configured for reducing tilt and offset between the dual-shot injection-molded optical folding element and the at least one imaging element.

9. The image capturing unit according to claim 1, further comprising an arc-shaped step structure disposed on at least one surface of the incident surface, the emitting surface and the reflective surface, wherein the arc-shaped step structure has an arc-shaped contour formed by taking a center of the at least one surface as a center point thereof.

10. The image capturing unit according to claim 1, wherein a maximum field of view of the image capturing unit is FOV, and the following condition is satisfied:

5 [deg.]<FOV<40 [deg.].

11. A camera module, comprising:
   the image capturing unit of claim 1; and
   an image sensor disposed on an image surface of the image capturing unit.

12. An electronic device, comprising:
   the camera module of claim 11.

* * * * *